United States Patent
Singh

(10) Patent No.: US 9,674,887 B2
(45) Date of Patent: Jun. 6, 2017

(54) SUBMISSIVE MOBILE NETWORK CONNECTION REGIME OF FIELD DEVICE IN MACHINE-TO-MACHINE NETWORK

(71) Applicant: Seeonic, Inc., Plymouth, MN (US)

(72) Inventor: Nicholas Singh, Apple Valley, MN (US)

(73) Assignee: Seeonic, Inc., Plymouth, MN (US)

( * ) Notice: Subject to any disclaimer, the term of this patent is extended or adjusted under 35 U.S.C. 154(b) by 0 days.

(21) Appl. No.: 14/611,234

(22) Filed: Jan. 31, 2015

(65) Prior Publication Data

US 2016/0227598 A1    Aug. 4, 2016

(51) Int. Cl.

| | | |
|---|---|---|
| H04W 72/00 | (2009.01) | |
| H04W 76/02 | (2009.01) | |
| H04W 4/00 | (2009.01) | |
| H04W 48/00 | (2009.01) | |
| H04W 88/06 | (2009.01) | |

(52) U.S. Cl.
CPC ......... *H04W 76/027* (2013.01); *H04W 4/005* (2013.01); *H04W 48/17* (2013.01); *H04W 88/06* (2013.01)

(58) Field of Classification Search
CPC .......................... H04W 76/027; H04W 76/025
USPC .......... 455/450, 433, 435.1, 452.2, 62, 63.1, 455/458, 509, 552.1
See application file for complete search history.

(56) References Cited

U.S. PATENT DOCUMENTS

| | | | |
|---|---|---|---|
| 5,978,679 A | 11/1999 | Agre | |
| 8,226,151 B2* | 7/2012 | Miyake | B60J 5/101 296/106 |
| 8,498,615 B2* | 7/2013 | Gupta | H04W 4/24 455/411 |
| 8,767,630 B1* | 7/2014 | Collins | H04L 43/00 370/328 |
| 8,781,475 B1 | 7/2014 | McKeeman et al. | |
| 8,989,091 B2* | 3/2015 | Muhanna | H04W 4/005 370/328 |
| 9,071,925 B2* | 6/2015 | Viswanathan | H04W 4/005 |
| 9,118,464 B2* | 8/2015 | Nix | H04W 52/0235 |
| 9,226,289 B2* | 12/2015 | Gupta | H04W 72/0446 |
| 9,248,246 B2* | 2/2016 | Zhu | A61M 11/001 |
| 9,307,344 B2 | 4/2016 | Rucker et al. | |
| 9,307,397 B2* | 4/2016 | Poon | H04W 12/06 |
| 9,332,487 B2* | 5/2016 | Taneja | H04W 48/16 |
| 9,344,859 B2* | 5/2016 | Kim | H04W 4/06 |
| 2012/0030358 A1* | 2/2012 | MacKenzie | H04W 52/0216 709/226 |

(Continued)

Primary Examiner — Marceau Milord
(74) Attorney, Agent, or Firm — Merchant & Gould P.C.

(57) ABSTRACT

A method is provided for a remotely-deployed field device to automatically select one of different mobile network modes to communicate with a server computing device. The field device is configured to maintain consistent and reliable connection with the server computing device by automatically switching between different mobile network modes that are selectively open and active based on various criteria, such as technical and/or business considerations. The automatic selection of mobile network modes is achieved in a submissive mobile network connection regime in which the remotely deployed field device autonomously operates to submit to whichever mobile network mode is open and active under preset criteria.

18 Claims, 21 Drawing Sheets

(56) References Cited

U.S. PATENT DOCUMENTS

| | | | | |
|---|---|---|---|---|
| 2012/0164954 | A1* | 6/2012 | Karampatsis | H04W 4/005 455/67.11 |
| 2015/0071139 | A1* | 3/2015 | Nix | H04W 52/0235 370/311 |
| 2015/0135259 | A1* | 5/2015 | Ilyadis | H04L 63/0227 726/1 |
| 2015/0296421 | A1* | 10/2015 | Karlsson | H04W 48/18 455/436 |
| 2016/0055537 | A1* | 2/2016 | Tiger | G06Q 50/01 705/14.64 |
| 2016/0100362 | A1* | 4/2016 | Palanisamy | H04W 52/0212 370/311 |
| 2016/0119738 | A1* | 4/2016 | Hampel | H04W 4/005 370/329 |
| 2016/0119739 | A1* | 4/2016 | Hampel | H04W 4/005 370/315 |

* cited by examiner

SUBMISSIVE MOBILE NETWORK CONNECTION REGIME OF FIELD DEVICE IN MACHINE-TO-MACHINE NETWORK

BACKGROUND

Electronics deployed in a machine-to-machine (M2M) network are typically remote sensor or actuator devices that can be monitored or controlled by a centralized computer system. Each device serves as a node in the M2M network. Data within the network can be transmitted and received via the Internet. In certain situations, such networks use wireless modalities including WiFi, Bluetooth™ or Zigbee™. As remote M2M nodes become more geographically dispersed, use of cellular communications is necessary to provide sufficient network connectivity. In some examples, Global System for Mobile Communications (GSM) and Code Division Multiple Access (CDMA) cellular technology topologies are used.

Both GSM and CDMA communications are not always available for an in-field M2M device, depending on its geographical proximity to cellular base station infrastructure, the presence of RF barriers, or other interference. Furthermore, a M2M node is often designed with circuitry for only one type of cellular technology. Such a node will not be able to connect to a network if it is not in sufficient proximity to a base station of the same cellular technology, and therefore will be unable to communicate to a centralized computer system. It is possible to design a device to use circuitry for multiple cellular technologies, but a major drawback is that cellular carrier fees are incurred to open both carrier accounts, even if only one account is actively used in the field. Moreover, selectively switching remote nodes between technologies while synchronizing the availability of their respective carrier accounts is a technical and logistical challenge. For many large M2M node deployments, such methodologies are economically and technically unfeasible.

SUMMARY

In general terms, this disclosure is directed to systems and methods in which a remotely-deployed device automatically communicates with a server computing device using one of different mobile network modes. In one possible configuration and by non-limiting example, the device can independently operate to automatically submit to one of the mobile network modes, which selectively become available based upon various considerations or events. Various aspects are described in this disclosure, which include, but are not limited to, the following aspects.

One aspect is a method of automatically selecting one of a plurality of mobile network modes, the method comprising: storing, in at least one field device, information about a previous mobile network mode, the previous mobile network mode being a mobile network mode through which an operable data transfer connection has previously been established with a server computing device; and attempting to establish a data transfer connection with the server computing device on the previous mobile network mode using the information about the previous mobile network.

Another aspect is a field device for automatically selecting one of a plurality of mobile network modes, the system comprising: a functional circuit configured to perform a predetermined function of the field device; at least one processing subcircuit configured to control operation of the field device; and a set of one or more storage subcircuits storing processor instructions that, when executed by the at least one processing subcircuit, cause the field device to: store information about a previous mobile network mode, the previous mobile network mode being a mobile network mode through which an operable data transfer connection has previously been established between the field device and a server computing device; and attempt to establish an operable data transfer connection between the field device and the server computing device on the previous mobile network mode using the information about the previous mobile network.

Yet another aspect is a storage medium comprising processor instructions that, when executed, cause a field device to: store information about a previous mobile network mode among a plurality of mobile network modes, the plurality of mobile network modes including a first mobile network mode and a second mobile network mode, the previous mobile network mode being a mobile network mode through which an operable data transfer connection has previously been established between the field device and a server computing device; attempt to establish a data transfer connection with the server computing device on the previous mobile network mode using the information about the previous mobile network; monitor that the data transfer connection is established between the field device and the server computing device on the previous mobile network mode; if the data transfer connection is not established, attempt to establish a data transfer connection with the server computing device on one of the other mobile network modes; if the data transfer connection is established with the server computing device on any one of the plurality of mobile communication network modes, stop the attempt to establish a data transfer connection with the server computing device on the rest of the mobile communication network modes; store information about the previous mobile network mode if the attempt fails to establish a data transfer connection with the server computing device on one of the other mobile communication network modes; if the data transfer connection is established with the server computing device on any of the mobile network modes, transferring data of signal qualities of all of the mobile network modes to the server computing device; if the previous mobile network mode is the first mobile network mode, attempt to establish a data transfer connection with the server computing device on the first mobile network mode; if the attempt fails to establish a data transfer connection on the first mobile network mode, attempt to establish a data transfer connection with the server computing device on the second mobile network mode; and if the attempt fails to establish a data transfer connection on the second mobile network mode, switching the field device into an inactive operation.

DETAILED DESCRIPTION

Figure 1:
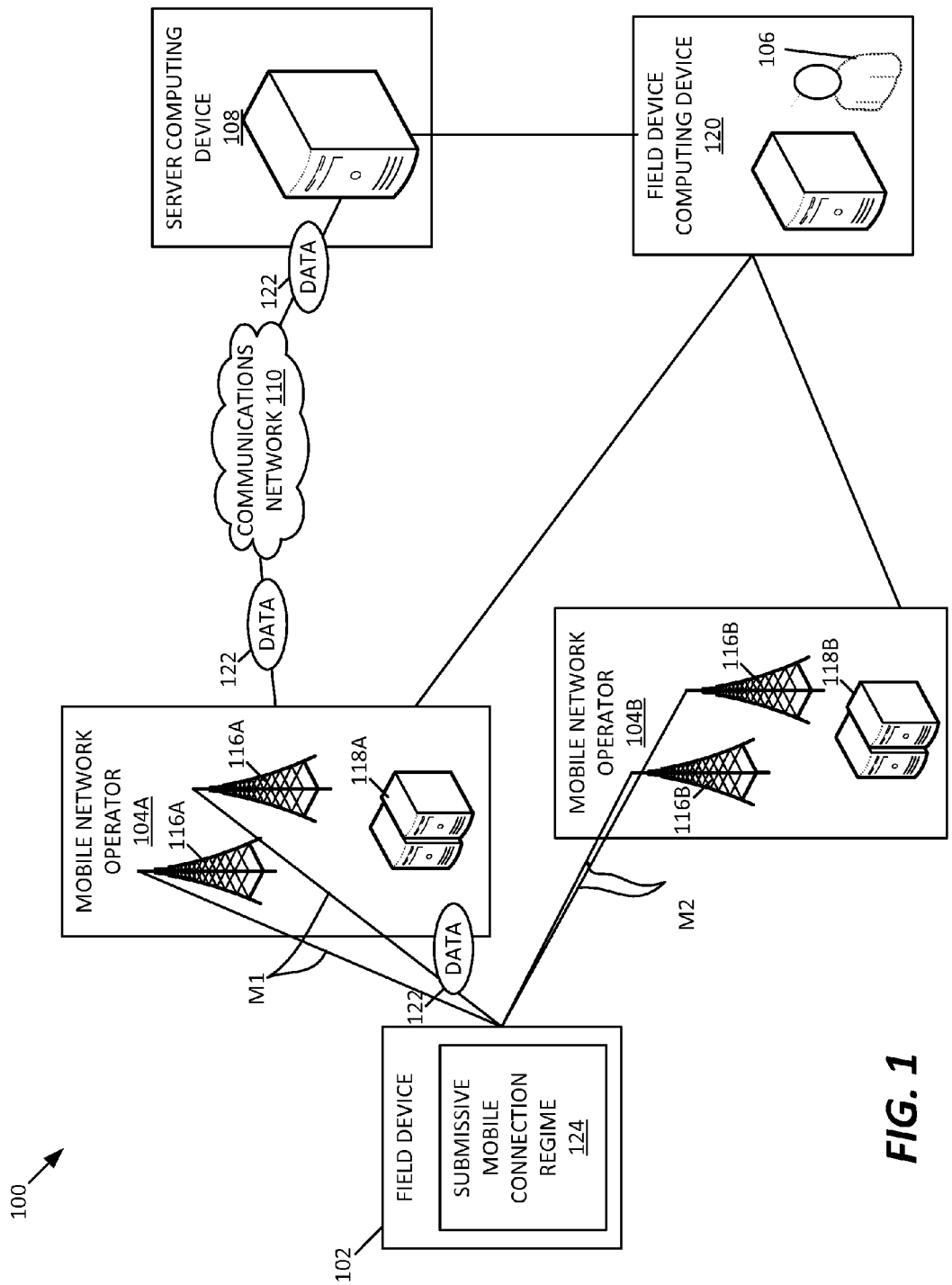
FIG. 1 illustrates example communications architecture.

Various embodiments will be described in detail with reference to the drawings, wherein like reference numerals represent like parts and assemblies throughout the several views.

In general, the present disclosure relates to a method of selecting different mobile network modes for a field device deployed remotely and connecting on a selected mobile network mode to a server computing device in the context of a machine-to-machine (M2M) network. The field device is configured to maintain consistent and reliable connection with the server computing device by enabling the field device to automatically switch between different mobile network modes that are selectively open and activated based on various criteria, such as technical and/or business considerations. Such different mobile network modes can be implemented by different mobile technologies, such as a Global System for Mobile Communications (GSM) technology and a Code Division Multiple Access (CDMA) technology, and can be provided by different mobile network operators. The selection of different mobile network modes is achieved in a submissive mobile network connection regime (which may alternatively be referred to as a submissive mobile connection mode) in which the remotely deployed field device autonomously operates to automatically submit to whichever mobile network mode is available based on availability of cellular base stations in the field and active based on the data account (also referred to herein as carrier account) status of the mobile network operator for that field device. Therefore, the switching of mobile network modes does not require the server computing device or any other computing devices to interact with the field device.

The transition can take place by simply enabling or disabling the data account of a corresponding mobile network operator. The field device will automatically submit to this change in carrier account status and continue using the account which is available and active. No matter which mobile network operator account is being used, the field device will log the signal quality statistics of whichever mobile network operator cellular base station is in vicinity of the field device. This allows a user of the network operator account to independently select which mobile network operator (e.g., mobile network mode) is best for a particular field device based on technical and non-technical criteria. Technical criteria include signal quality at a given location. Non-technical criteria include the cost of one mobile network carrier data account versus another mobile network carrier account. The submissive mobile network connection regime allows machine-to-machine nodes, such as the field device, to consistently and reliably switch to different mobile network modes without coordinating commands between the respective mobile network operators, thereby eliminating the possibility of complex race conditions incurred when sending commands as well as the need to have the field device or the server computing device interact with the account management systems of a mobile network operator during the switching of a mobile network.

FIG. 1 illustrates an example communications architecture 100. The communications architecture 100 includes a field device 102, a plurality of mobile network operators 104 (including 104A and 104B), a field device user 106, a server computing device 108, and a communications network 110. Each of the mobile network operators 104 includes one or more base stations 116 (including 116A and 116B) and an operator computing device 118 (including 118A and 118B). The field device user 106 includes a user computing device 120. Also shown is data 122 and a plurality of mobile network modes M (including M1 and M2).

In some embodiments, the communications architecture 100 is configured as a mobile network, which is also referred to herein as a cellular network. The communications architecture 100 provides a radio network distributed over land areas (i.e., cells), each of which is served by at least one base station 116. Each cell uses a different set of radio frequencies from its neighboring cells to avoid any interference.

The field device 102 is an electronic device configured to perform a predetermined function, such as detecting events or changes, to collect and generate data 122. The field device 102 further operates to communicate with the server computing device 108 to transmit the data 122. In some embodiments, the field devices 102 are nodes in a machine-to-machine (M2M) network, along with the server computing device 108. An example of the field device 102 is described and illustrated in more detail with reference to FIGS. 9-21.

The field device 102 is configured to operate in a submissive mobile network connection regime 124, in which the field device 102 independently operates to automatically submit to whichever mobile network mode M (e.g., either M1 or M2) is activated. The activation status of carrier accounts associated with the mobile network modes M determines what carrier account the field device 102 utilizes without any external communications or asynchronous commands that involve a data transfer between the field device 102 and the server computing device 108, which can create complex race conditions. As such, the switching of mobile network modes M does not require the server computing device 108 or any other computing devices to interact with the field device 102. The submissive mobile network connection regime 124 allows machine-to-machine nodes, such as the field device 102, to consistently and reliably switch between different mobile network modes without coordinating commands between the respective mobile network operator, thereby eliminating the need to have the field device or the server computing device interact with the account management systems of a mobile network operator during the switching of a mobile network. Moreover, the submissive mobile connection regime as described herein allows the operator of the server computing device to avoid the need to spend funds on engineering complex API integrations between the server computing device and various mobile network carrier account management systems that can create complex race conditions. An example operation of the network connection operation engine 408 is described and illustrated in more detail with reference to FIG. 15.

The mobile network operators 104 are providers of wireless communications services and control various elements necessary to deliver the services to end users, such as the field device user 106. For example, the mobile network operators 104 allocate radio spectrum, develop and manage wireless network infrastructure, and perform customer services, such as billing and customer care. The mobile network operators 104 are also referred to herein as wireless service providers, wireless carriers, cellular companies, or mobile network carriers. In the United States market, examples of the mobile network operators 104 include Verizon Wireless, AT&T Mobility, T-Mobile, and Sprint.

As illustrated, the mobile network operators 104 include one or more base stations 116. The base stations 116 are wireless communications stations installed at fixed locations and used to communicate as part of the mobile network communications architecture 100.

Each of the mobile network operators 104 includes an operator computing device 118 used to manage the base stations 116 and other elements of wireless network infrastructure owned by the mobile network operator 104. The operator computing device 118 can be located in a different physical location from the base stations 116 and electrically networked to the base stations 116. The operator computing device 118 can also operate to interact with the field device user 106 and/or other entities and allow the field device user 106 and/or other entities to manage communications service accounts. An example operator computing device 118 is described and illustrated in FIG. 4.

The mobile network operators 104 provide different mobile network modes M (including M1 and M2) through which the field device 102 communicates with the server computing device 108. For example, a first mobile network operator 104A provides a first mobile network mode M1, and a second mobile network operator 104B provides a second mobile network mode M2. In some embodiments, different mobile network modes M are configured with different types of mobile technology (also referred to herein as mobile technology modes). Examples of mobile technology modes include a Global System for Mobile Communications (GSM) technology and a Code Division Multiple Access (CDMA) technology. For example, the first mobile network mode M1 employs a GSM technology, and the second mobile network mode M2 uses a CDMA technology, vice versa. In other embodiments, the mobile network modes M are configured with the same type of mobile technology, but provided by different mobile network operators 104. For example, the first and second mobile network modes M1 and M2 are configured as a GSM technology but provided by AT&T Inc. and T-Mobile Inc., respectively. Similarly, the first and second mobile network modes M1 and M2 are configured as a CDMA technology but provided by Verizon Communications and Sprint Corporation, respectively.

The field device user 106 is a user of the field device 102 for desired purposed in a desired location. The field device 102 is used to fulfill an objective of the field device user 106. For example, where the field device 102 is an inventory monitoring device as illustrated below, the field device user 106 can be a distributor or retailer that manages a stock of goods to be monitored.

In some embodiments, the field device user 106 includes the user computing device 120 used to interact with the mobile network operators 104 (e.g., the operator computing devices 118 thereof) to manage accounts associated with wireless communication services provided by the mobile network operators 104. An example user computing device 120 is illustrated and described in more detail with reference to FIG. 5.

The server computing device 108 operates to interact with the field device 102 through one of the mobile network modes M that is selectively established between the field device 102 and the server computing device 108. In some embodiments, the server computing device 108 operates to receive the data 122 from the field device 102, and store and manage the data 122 for various purposes, such as inventory management and field device configuration. The server computing device 108 can further interact with the user computing device 120 and transmit information about wireless network services provided by the mobile network operators 104 so that the field device user 106 manages the accounts for wireless communication services as appropriate (e.g., under various criteria, such as technical and/or business considerations). An example structure and operation of the server computing device 108 are illustrated and described in more detail with reference to FIG. 8.

The communications network 110 communicates digital data between one or more computing devices, such as between the mobile network operators 104 and the server computing device 108. Examples of the communications network 110 include one or more of a local area network and a wide area network, such as the Internet.

The data 122 includes various pieces of information collected and/or generated by the field device 102. The data 122 is transmitted from the field device 102 to the server computing device 108 when at least one of the mobile network modes M is successfully established therebetween, as described below. An example of the data 122 is described and illustrated in more detail with reference to FIG. 19.

Figure 2:
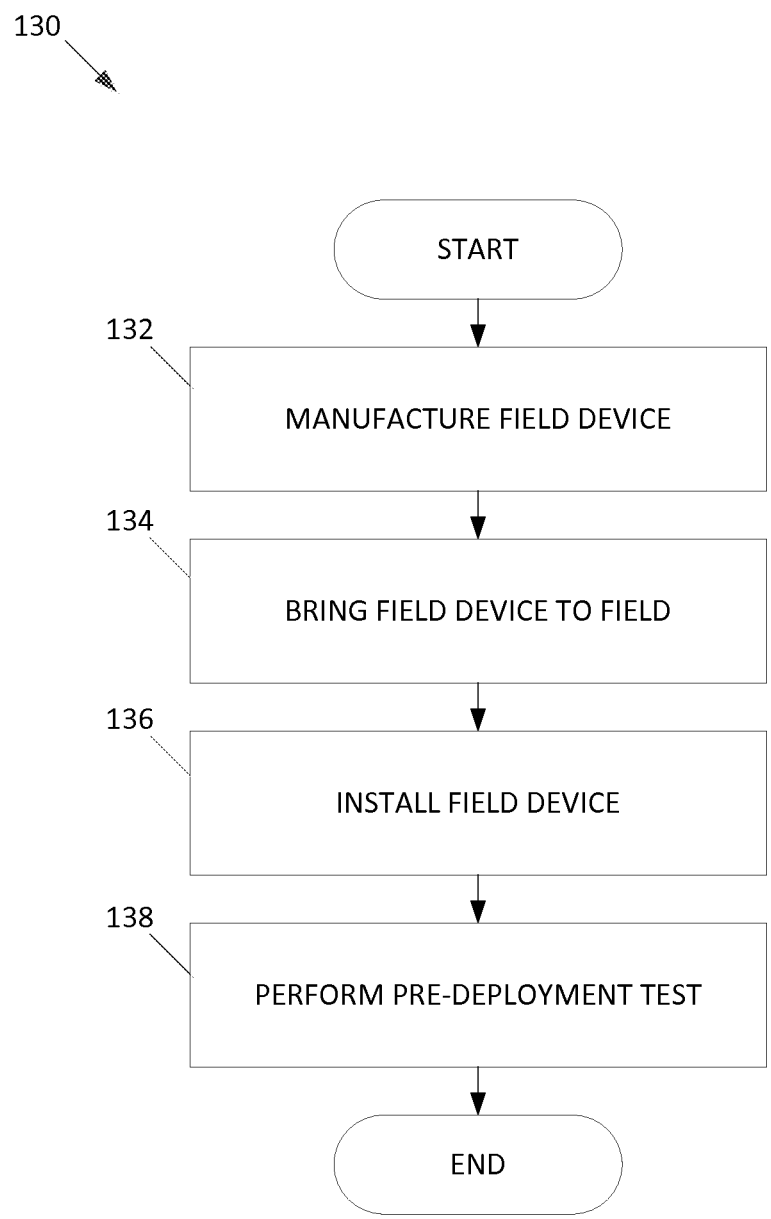
FIG. 2 is a flowchart illustrating an example method of deploying a field device 102 for use in a field.

FIG. 2 is a flowchart illustrating an example method 130 of deploying the field device 102 for use in a field. In some embodiments, the method 130 includes operations 132, 134, 136, and 138, At the operation 132, the field device 102 is manufactured to include a proper function suitable for an objective of the field device user 106. For example, the field device 102 is made to include a monitoring capability for inventory management, as exemplified herein.

At the operation 134, the field device 102 is brought to a field where the field device 102 is intended to be used.

At the operation 136, the field device 102 is installed to a desired location at which the field device 102 can perform a preset function, such as inventory monitoring.

At the operation 138, a pre-deployment test is performed for the field device 102. In the pre-deployment test, all carrier accounts for wireless communications services are activated. In some embodiments, in the pre-deployment test, the field device 102 is processed through an approval system that validates various high-level functionalities, such as an ability to successfully communicate data on all applicable mobile network modes M. The pre-deployment test can ensure that all hardware, firmware, and software systems on the field device 102 work appropriately and verify that the correct carrier accounts have been activated and configured. At least some of the mobile network operators 104 can allot a certain amount of data to be used freely for the pre-deployment test, thereby avoiding putting the carrier accounts into a persistent billing mode as a result of using cellular bandwidth for approval testing. In other embodiments, the pre-deployment test can be performed at the field before it is installed to an exact location.

Further, the operation 138 can include a process of activating the field device 102 in the field. The activation of the field device 102 can be performed in different manners, depending on different mobile network technologies. For example, for devices using GSM technologies, the activation can be done by simply attaching a subscriber identification module (SIM) card to a device. The SIM card contains several pieces of information (e.g., a unique serial number (ICCID), international mobile subscriber identity (IMSI), security authentication and ciphering information, temporary information related to a local network, a list of accessible services, a personal identification number (PIN), and a personal unblocking code (PUK)) that can be used to give the device access to the network. When the SIM card is physically inserted into a proper slot of the device, it provides proper credentials to the device. On the other hand, for a device using CDMA technologies, the device needs to communicate with a special server over-the-air (OTA) to get credential information that is unique to a carrier account on which the device has been activated. Such a server for over-the-air credentials can send the device credentials. An example server for over-the-air credentials can use Open Mobile Alliance Device Management (OMADM) protocols (e.g., for Sprint's system). In some embodiments, the OTA activation is performed as part of the pre-deployment process (as part of the approval testing) before the field device 102 is deployed to the field. In other embodiments, the OTA activation is performed in different situations.

Figure 3:
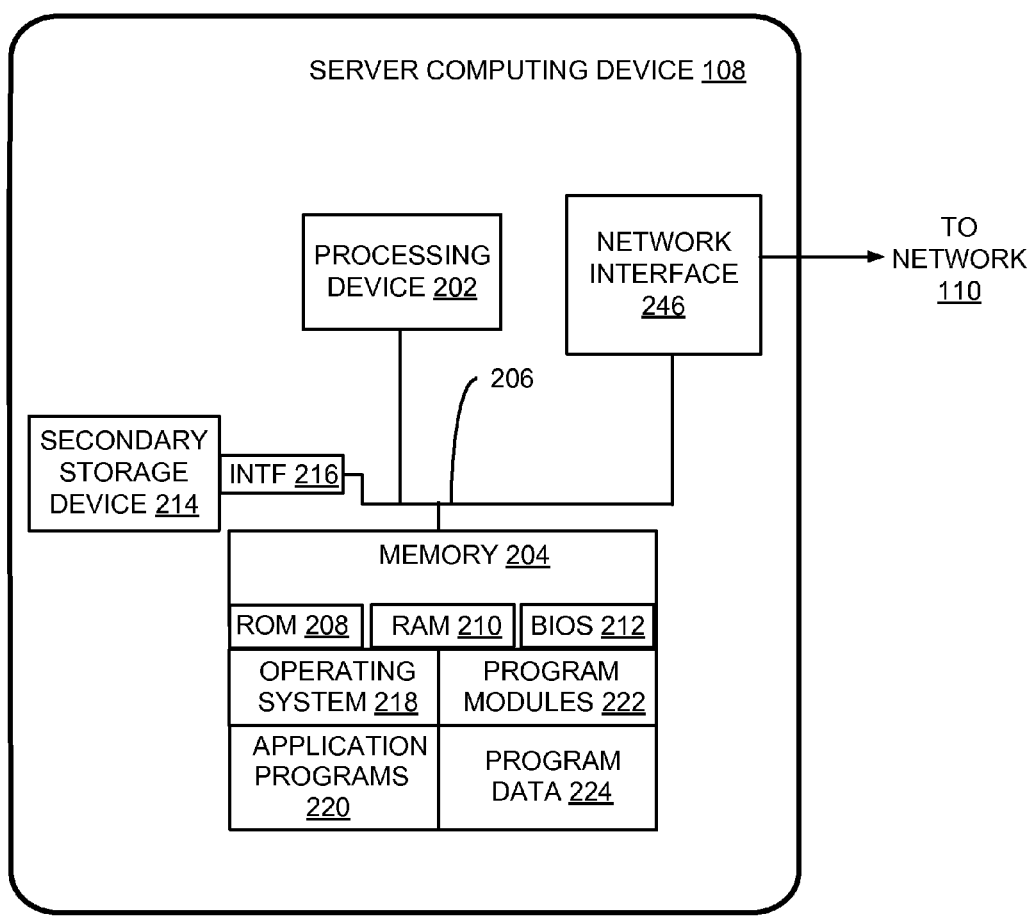
FIG. 3 illustrates an exemplary architecture of a computing device that can be used to implement aspects of the present disclosure.

FIG. 3 illustrates an exemplary architecture of the server computing device 108. The server computing device 108 is used to execute the operating system, application programs, and software modules (including the software engines) described herein. In some embodiments, other computing devices used in the communications architecture 100, such as the operator computing device 118 and the user computing device 120, are implemented similarly to the server computing device 108 as described below is To avoid undue repetition, this description of the computing device will not be separately repeated herein for each of the operator computing device 118 and the user computing device 120 illustrated in the present disclosure, but such devices can also be configured as illustrated and described with reference to FIG. 3.

The server computing device 108 includes, in some embodiments, at least one processing device 202, such as a central processing unit (CPU). A variety of processing devices are available from a variety of manufacturers, for example, Intel or Advanced Micro Devices. In this example, the server computing device 108 also includes a system memory 204, and a system bus 206 that couples various system components including the system memory 204 to the processing device 202. The system bus 206 is one of any number of types of bus structures including a memory bus, or memory controller; a peripheral bus; and a local bus using any of a variety of bus architectures.

Examples of computing devices suitable for the server computing device 108 include a server instance on a distributed processing infrastructure (such as Amazon Web Services or Microsoft Azure), an Infrastructure as a Service (IaaS) platform, a cloud platform or other devices configured to process digital instructions.

The system memory 204 includes read only memory 208 and random access memory 210. A basic input/output system 212 containing the basic routines that act to transfer information within server computing device 108, such as during start up, is typically stored in the read only memory 208.

The server computing device 108 also includes a secondary storage device 214 in some embodiments, such as a distributed network storage platform or hard disk drive, for storing digital data. The secondary storage device 214 is connected to the system bus 206 by a secondary storage interface 216. The secondary storage devices and their associated computer readable media provide nonvolatile storage of computer readable instructions (including application programs and program modules), data structures, and other data for the server computing device 108.

Although the exemplary environment described herein employs a distributed network storage platform using hard disk drives as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 214 or memory 204, including an operating system 218, one or more application programs 220, other program modules 222 (such as the software engines described herein), and program data 224. The server computing device 108 can utilize any suitable operating system, such as Microsoft Windows™, Google Chrome™, Apple OS, Linux, and any other operating system suitable for a computing device.

In some embodiments, the server computing device 108 includes input devices to enable a user to provide inputs to the server computing device 108. Examples of input devices include a keyboard, pointer input device, microphone, and display. Other embodiments include other input devices. The input devices are often connected to the processing device 202 through an input/output interface that is coupled to the system bus 206. These input devices 226 can be connected by any number of input/output interfaces, such as a parallel port, serial port, game port, or a universal serial bus. Wireless communication between input devices and interface is possible as well, and includes infrared, BLUETOOTH® wireless technology, 802.11a/b/g/n, cellular, or other radio frequency communication systems in some possible embodiments.

In this example embodiment, a display device, such as a monitor, liquid crystal display device, projector, or touch sensitive display device, is also connected to the system bus 206 via an interface, such as a video adapter. The display device can be configured as a touch sensitive display device that includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs. In addition to the display device, the server computing device 108 can include various other peripheral devices (not shown), such as speakers or a printer.

When used in a local area networking environment or a wide area networking environment (such as the Internet), the server computing device 108 is typically connected to the network through a network interface 246, such as a modem. Other possible embodiments use other communication devices. For example, some embodiments of the server computing device 108 include an Ethernet network interface, or a modem for communicating across a network such as the Internet.

The server computing device 108 typically includes at least some form of computer-readable media. Computer readable media includes any available media that can be accessed by the server computing device 108. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the server computing device 108.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Figure 4:
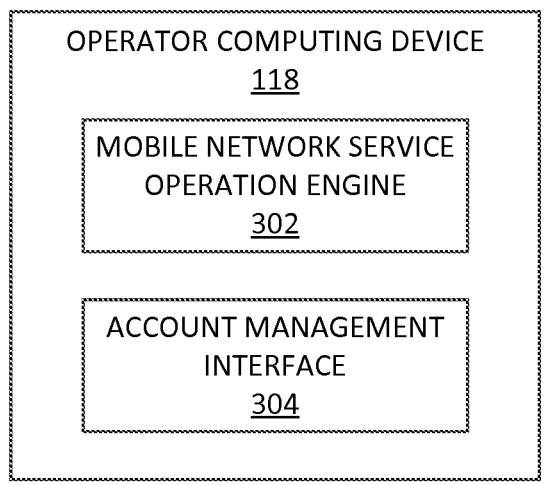
FIG. 4 illustrates an example operator computing device of a mobile network operator.

FIG. 4 illustrates an example operator computing device 118 of the mobile network operator 104. In some embodiments, the operator computing device 118 includes a mobile network service operation engine 302 and an account management interface 304.

The mobile network service operation engine 302 is configured to manage and deliver wireless communications services for the field device 102 to communicate with the server computing device 108. The mobile network service operation engine 302 can control various components used to provide the services, such as the base stations 116, network facilities, and other elements of mobile network infrastructure.

The account management interface 304 is configured to enable the field device user 106 to interact with the operator computing device 118 and manage a carrier account associated with mobile communication serviced provided by the mobile network operator 104. In some embodiments, the account management interface 304 provides application program interfaces (APIs) that allow the field device user 106 to manage its carrier account as appropriate. For example, the field device user 106 can turn the carrier account on or off (i.e., activate or deactivate the account), control a machine-to-machine provisioning, billing, and/or device and service management, based on various considerations as described below. Examples of the account management interface 304 include Sprint Command Center™ provided by Sprint Corporation and AT&T Control Center™ provided by AT&T Inc.

Figure 5:
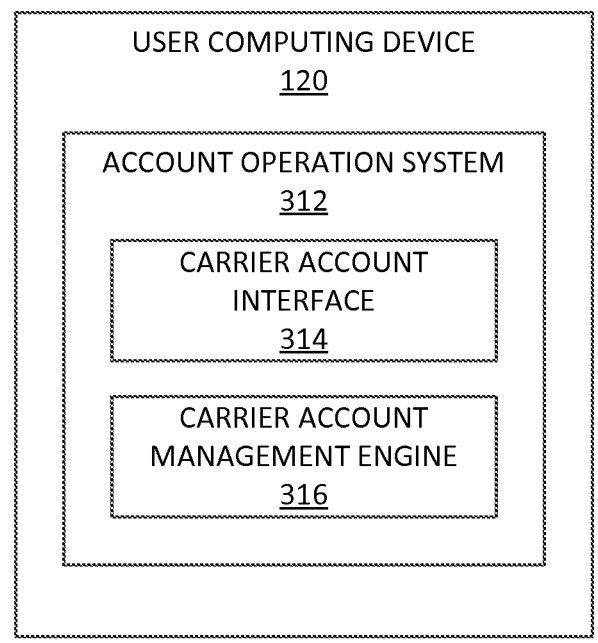
FIG. 5 illustrates an example user computing device.

FIG. 5 illustrates an example user computing device 120. In some embodiments, the user computing device 120 executes an account operation system 312 that includes a carrier account interface 314 and a carrier account management engine 316.

The account operation system 312 is configured to manage one or more carrier accounts associated with different mobile network operators 104.

The carrier account interface 314 of the account operation system 312 provides an interface for interact with the operator computing device 118 through the account management interface 304 thereof. In some embodiments, the carrier account interface 314 provides web interfaces (e.g., web browser) that allow for activating and deactivating accounts. In other embodiments, the carrier account interface 314 can have web APIs that allow for more automated control of account activation and deactivation.

The carrier account management engine 316 operates to enable the field device user 106 to manage different carrier accounts. As described below, the carrier account management engine 316 is configured to selectively activate or deactivate the carrier accounts based upon one or more criteria 330 (FIG. 7) so that the field device 102 submits to one of the mobile network modes M that is activated to open a data transfer connection to the server computing device 108. An example operation of the carrier account management engine 316 is illustrated and described in more detail with reference to FIG. 6.

In the example of FIG. 5, it is described that the account operation system 312 is executed in the user computing device 120. In other embodiments, however, the account operation system 312 is included in the server computing device 108 and performed by the server computing device 108 that can directly interact with the operator computing device 118 via the account management interface 304 thereof.

Figure 6:
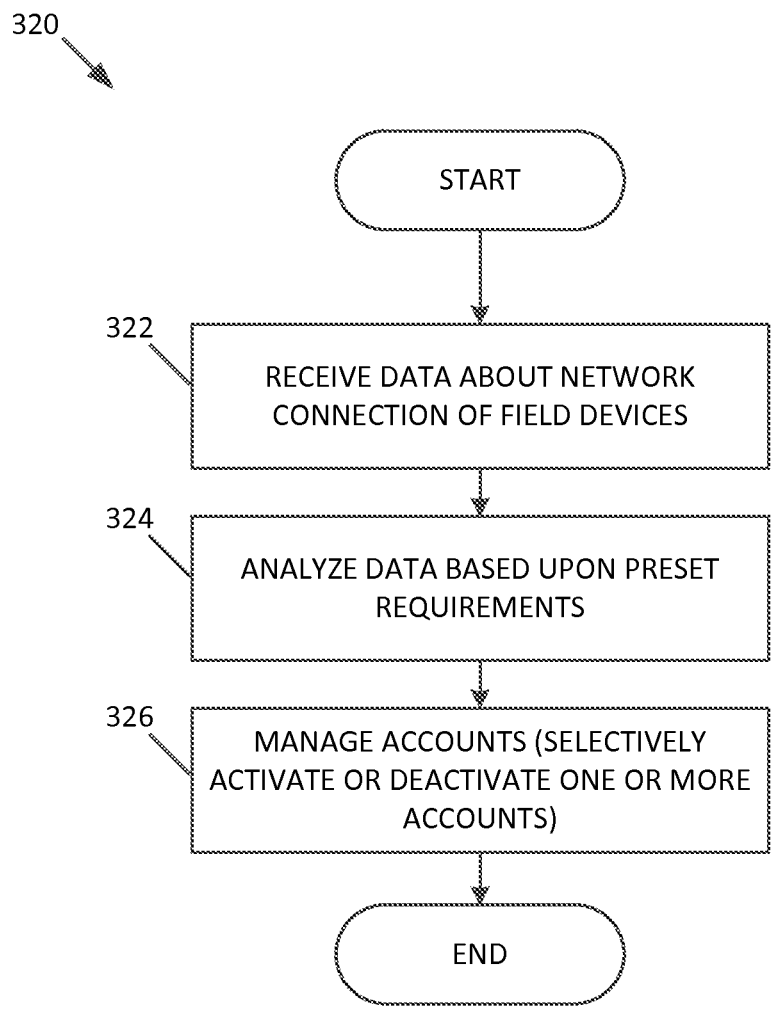
FIG. 6 is a flowchart illustrating an example method of operating a carrier account management engine.

FIG. 6 is a flowchart illustrating an example method 320 of operating the carrier account management engine 316 (shown in FIG. 5). In some embodiments, the method 320 includes operations 322, 324, and 326.

Figure 19:
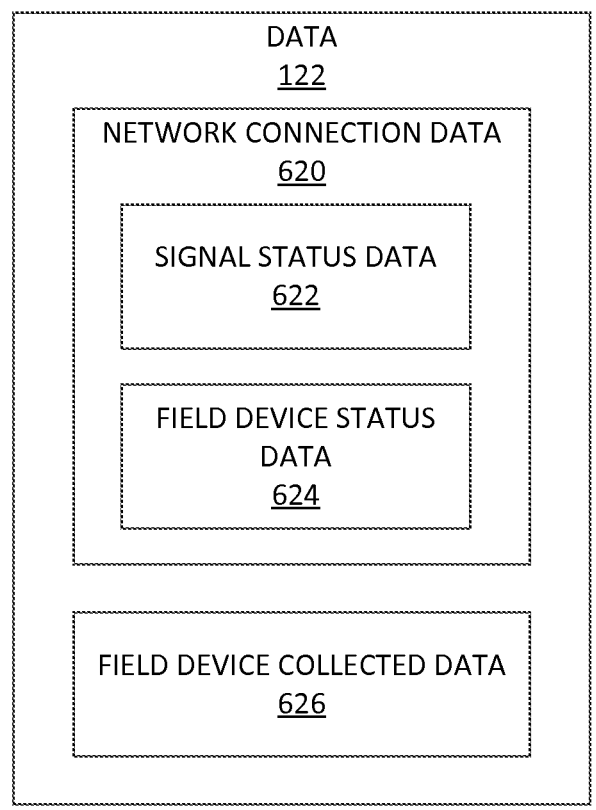
FIG. 19 illustrates an example structure of data transferred from the field device to the server computing device.

At the operation 322, the carrier account management engine 316 receives network connection data 620 (FIG. 19). In some embodiments, the network connection data 620 are associated with the field devices 102 that are installed in various locations under control. As further described in FIG. 20, the network connection data 620 can include signal strengths or qualities of the mobile network modes M available to the field devices 102.

Figure 7:
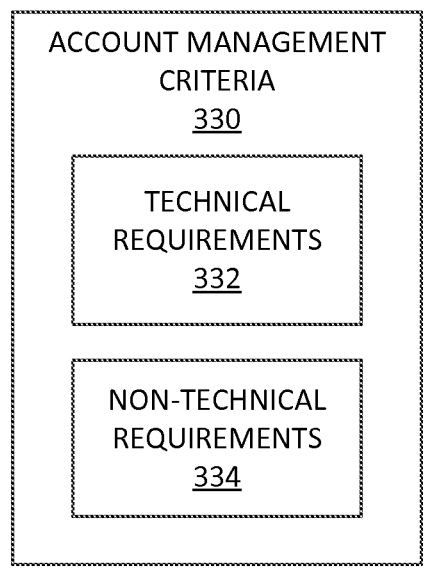
FIG. 7 illustrates example criteria used for managing carrier accounts associated with mobile communication services provided by different mobile network operators.

At the operation 324, the carrier account management engine 316 operates to analyze the network connection data 620 based on one or more criteria 330 (FIG. 7). The network connection data 620 is evaluated to determine whether the field devices 102 are in data communication with the server computing device 108 as appropriate to meet the criteria 330 set by the field device user 106. In some embodiments, the evaluation of the network connection data 620 can be manually performed based on an output of the analysis of the network connection data 620 performed by the carrier account management engine 316. In other embodiments, the network connection data 620 can be evaluated automatically by the carrier account management engine 316 in accordance with the criteria 330. In yet other embodiments, the evaluation can be done by a combination of manual and automatic processes.

At the operation 326, the carrier account management engine 316 operates to manage carrier accounts to satisfy the criteria 330. For example, if it is determined that at least one of the mobile network modes M for the field devices 102 does not meet the criteria 330, the carrier account management engine 316 can change the setting of carrier accounts associated with the unsatisfactory mobile network modes M. The carrier accounts of the mobile network modes M that do not satisfy the criteria 330 can be deactivated as other carrier accounts are activated to replace the deactivated carrier accounts.

By way of example, when the field device 102 has been out in the field for a substantial amount of time after deployment, the field device user 106 (and/or the user computing device 120 thereof) can analyze the signal quality conditions obtained from the field device 102. If the field device 102 is considered to be stable on a particular mobile network mode M, the other mobile network mode M can be deactivated. By way of another example, if the field device 102 is utilizing the first mobile network mode M1 with satisfactory signal quality, but is simultaneously reporting that the signal quality for the second mobile network mode M2 is also satisfactory and the network operator data account (e.g., the carrier account) for the second mobile network mode M2 is less expensive, the second mobile network mode M2 is activated and the first mobile network mode M1 is deactivated. In some embodiments, the operation of selectively activating and deactivating carrier accounts can be performed through a command user interface or API provided by the mobile network operators 104 (e.g., Sprint Command Center™ provided by Sprint Corporation and AT&T Control Center™ provided by AT&T Inc.). These services can have web interfaces that allow for activating and deactivating accounts, and also can have web APIs that allow for more automated control of account activation and deactivation. In some embodiments, an algorithm is programmed in the user computing device 120 and/or the server computing device 108 to automate the processes.

As described below, the field devices 102 will automatically submit to such other mobile network modes M that become available for the field devices 102 as a result of the activation of the associated carrier accounts, and thus establish data transfer connection with the server computing device 108 through the mobile network modes M.

As such, switching the mobile network modes M does not involve the field devices 102 in the present disclosure. As further described below, the selection of different mobile network modes M is achieved in a submissive mobile network connection regime 124 in which the field devices 102 independently operate to automatically submit to whichever mobile network mode M is open and active under the criteria 330. The switching of mobile network modes M does not require the server computing device 108 or any other computing devices to interact with the field devices 102, thereby eliminating the need of executing a complex, orchestrated sequence of events that are typically required to shut down one carrier account and switch to a different carrier account. Typically, the user computing device 120 or other computing devices need to perform several steps to switch into a different carrier account, such as first connecting to the field device 102 via the original carrier account, sending the field device 102 a command to switch to a different carrier account, waiting for the field device 102 to send an acknowledgement back, verifying the connectivity of the field device 102 with the different carrier account, and finally shutting down the original carrier account. These complex switching operations can lead to a race condition. These complex switching operations also require complex API integration with mobile network operator account management platforms, making it time-consuming and expensive to develop new system integrations each time a new carrier is desired to be used with a field device. The submissive mobile network connection regime 124 of the present disclosure can eliminate these complexities.

FIG. 7 illustrates example criteria 330 used for managing carrier accounts associated with mobile communication services provided by different mobile network operators 104. In some embodiments, the criteria 330 include technical requirement portion 332 and the non-technical requirement portion 334.

The field devices 102 are configured to communicate with the server computing device 108 through different mobile network modes M provided by different mobile network operators 104. Practically, all of the carrier accounts associated with such different mobile network modes M do not always remain activated when the field devices 102 are in operation in the field due in part to financial reasons, such as cost efficiency. Instead, it is efficient to selectively turn on only one or some of the available carrier accounts while turning off the other carrier accounts. The decision of selective activation or deactivation of carrier accounts involves various considerations, and the criteria 330 are configured to include such various considerations. Further, the criteria 330 can reflect various objectives that the field device user 106 wants to achieve in utilizing different mobile network modes M for the field devices 102.

The technical requirement portion 332 of the criteria 330 can include technical requirements or status relating to the field devices 102, such as signal strengths and signal qualities of mobile network modes M through which the field devices 102 is connected to the server computing device 108. As described herein, the signal strengths and/or qualities are monitored by the field devices 102 and sent to the server computing device 108, which is then provided to the field device user 106 (e.g., transmitted to the user computing device 120 thereof).

The non-technical requirement portion 334 can include various business-related requirements or rules, such as financial, political, and other strategic considerations. In some embodiments, the non-technical requirement portions 334 can be used to select the most economically advantageous mobile network mode M. In other embodiments, the non-technical requirements 334 concern other issues than mere economic feasibility. By way of example, there can be an occasion where contractual terms with the mobile network operators 104 are changed, causing the current mobile network mode M to become more expensive than another mobile network mode M. Then, the non-technical requirements 334 can be updated to reflect the change in contractual terms, and is then used to allow the field device user 106 (e.g., the carrier account management engine 316 of the user computing device 120 thereof) to activate the other mobile network mode M and deactivate the current mobile network mode M.

Although it is important that a deployed field device selects the best technology once in the field, business and financial considerations are also considered in many situations. By way of example, a higher quality signal may not be preferable if the signal of a particular mobile network mode M is of an acceptable quality but has a lower price per data rate compared to the other mobile network mode M of a higher-performing signal. Moreover, while it is economically feasible to deploy a field device with multiple data accounts active for both of the mobile network modes M1 and M2 (e.g., GSM and CDMA technology mobile network modes), it is costly to maintain both accounts open for the lifetime of the field device. It is rather economically and logistically advantageous to only keep a single account open and in a state of billing.

The technical and non-technical requirements, rules, and status for satisfying the objectives of the field device user 106 can be frequently altered during the operation of the field devices 102, and, therefore, the criteria 330 are frequently updated to reflect such changes. In some embodiments, the technical requirement portion 332 and the non-technical requirement portion 334 of the criteria 330 can be used together to meet a particular objective of the field device user 106. In other embodiments, either the technical requirement portion 332 or the non-technical requirement portion 334 of the criteria 330 is exclusively used.

Figure 8:
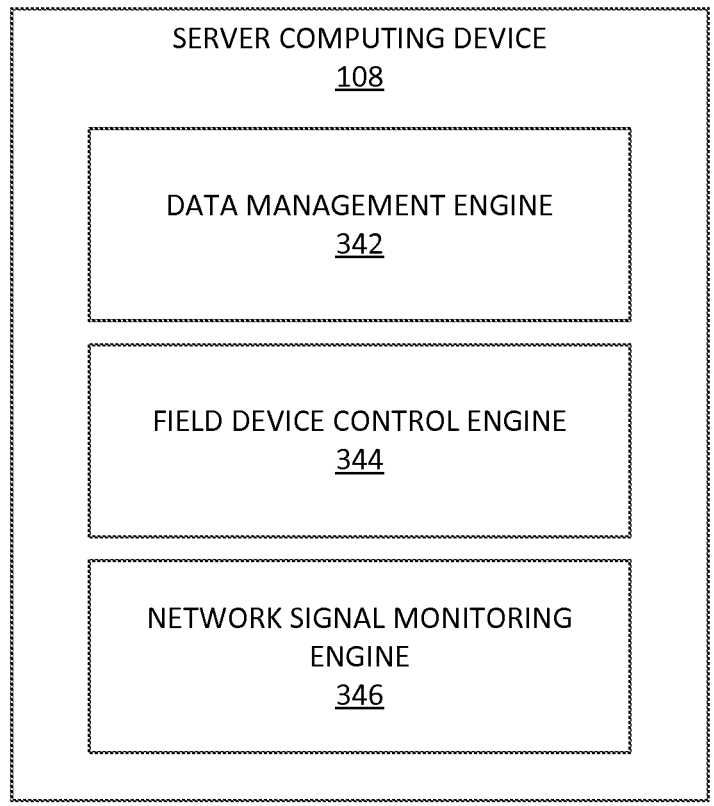
FIG. 8 illustrates an example server computing device.

FIG. 8 illustrates an example server computing device 108. In some embodiments, the server computing device 108 operates a data management engine 342, a field device control engine 344, and a network signal monitoring engine 346.

The server computing device 108 can function as a data repository for the data 122 (FIG. 19) transmitted from the field devices 102. Such data repositories can include postgres database, mySQl database, SQL database, a Hadoop or Mapreduce cluster, AWS redshift, AWS RDS, noSQL or ERP systems such as SAP and Oracle. The server computing device 108 can be implemented in various manners. In some embodiments, the server computing device 108 is configured as a web server. By way of example, the server computing device 108 is implemented as an Apache web server that is physically deployed on one of Amazon Web Services (AWS) computing instances, which is accessible either on a public Internet accessible IP or a virtual private network (VPN) tunnel.

Figure 9:
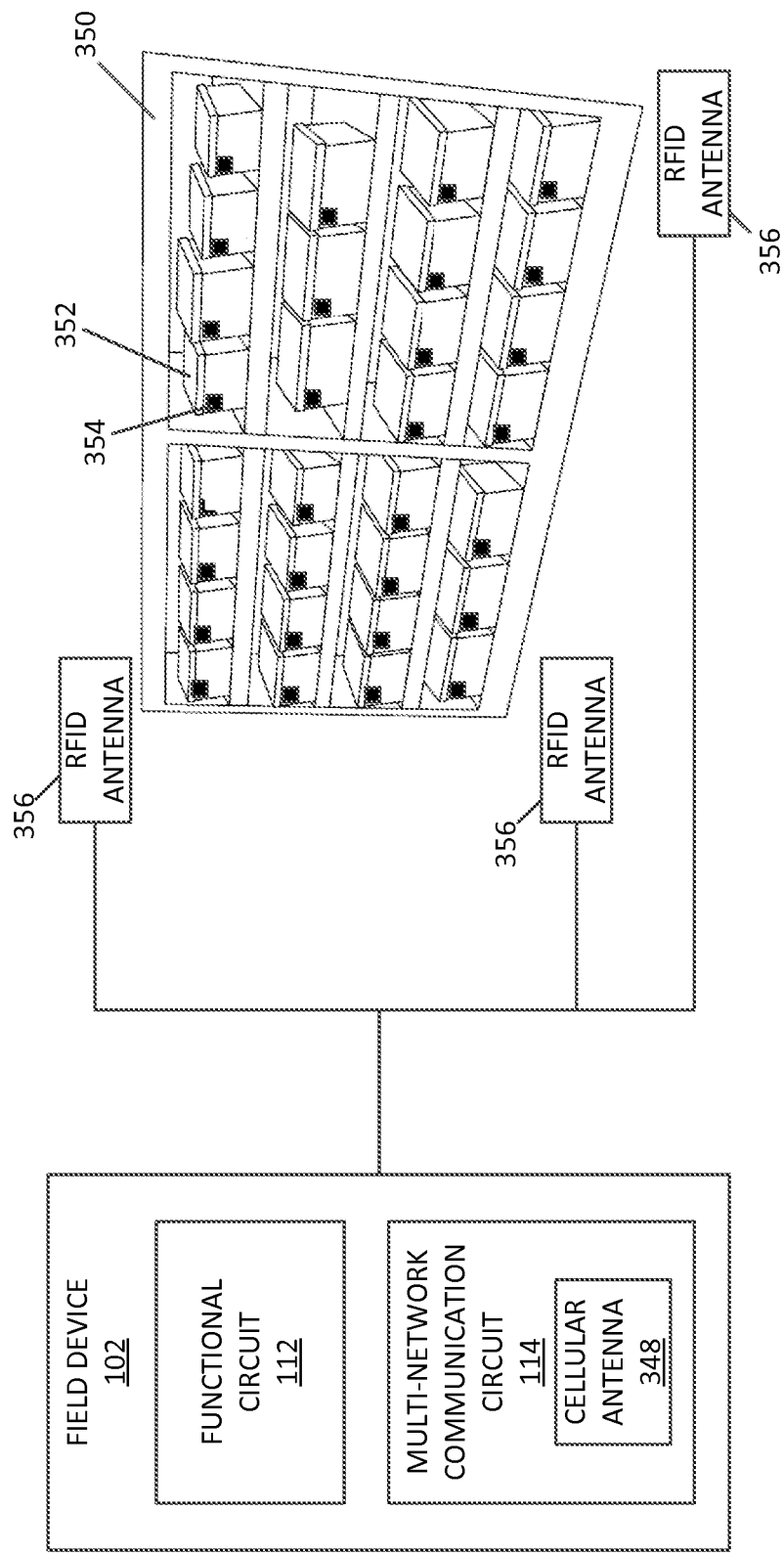
FIG. 9 illustrates an example application of the field device.

The data management engine 342 operates to parse data 122 collected by the field devices 102 and transmitted to the server computing device 108. In the illustrated example of the present disclosure, the data 122 include inventory information of the products 352 (FIG. 9). The data management engine 342 can convert the data 122 into a format usable by the field device user 106 and/or the user computing device 120 of the field device user 106 and send it to the field device user 106 (e.g., to the user computing device 120 thereof).

The field device control engine 344 operates to manage and control the field devices 102. For example, the field device control engine 344 can send configuration and operation commands to the field devices 102. In some embodiments, the field device control engine 344 uses field device status data 624 (FIG. 19) relating to the health and status of the field devices 102 to control the field devices 102.

The network signal monitoring engine 346 operates to receive and parse signal status data 622 to evaluate the signal strengths and/or qualities of different mobile network modes M available to the field devices 102. The signal status data 622 can be transmitted to the user computing device 120 of the field device user 106 to be used in managing carrier accounts.

Referring to FIGS. 9-21, an example field device 102 is described and illustrated in more detail. It is primarily described in the illustrated example of FIGS. 10-21 that the field device 102 operates in a situation where there are two mobile network modes M1 and M2, which use different mobile network technologies, such as GSM and CDMA. In other embodiments, however, the field device 102 operates in other situations, such as where there are two mobile network modes that use the same mobile technology but are provided by different mobile network operators 104 and where there are more than two mobile network modes M, which are distinguished by either mobile technologies or mobile network operators, or both.

FIG. 9 illustrates an example application of the field device 102. In some embodiments, the field device 102 includes a functional circuit 112 and a multi-network communications circuitry 114.

The functional circuit 112 is configured to perform a predetermined function, such as detecting events or changes, to collect and generate data 122, as described below.

The multi-network communications circuitry 114 operates to establish mobile communications to the server computing device 108 and interact with the server computing device 108 (e.g., sending the data 122 to the server computing device 108) through different mobile communication network modes provided by different mobile network operators 104. In some embodiments, a plurality of field devices 102 are used to perform a predetermined function and communicate with the server computing device 108 in different communication network modes.

As illustrated, the multi-network communications circuitry 114 includes a cellular antenna 348 electrically connected thereto. The cellular antenna 348 is used to establish communications with one or more available base stations 116 on at least one mobile network mode M. The cellular antenna 348 can be incorporated in the field device 102 as one or more on-board custom printed circuit board antenna stackup, such as A10315 available from Antenova of Cambridge, UK.

In this application, the field device 102 is used as an inventory monitoring device. The functional circuit 112 of the field device 102 is configured to monitor an inventory of products to be managed. In some embodiments, a product storage structure 350, one or more products 352, one or more product information tags 354 (e.g., RFID tags as described below), and one or more antennas 356 (e.g., RFID antennas as described below) are provided.

The product storage structure 350 is configured to at least temporarily store the products 352 thereon. In some embodiments, the product storage structure 350 provides shelves on which the products 352 are supported. In some embodiments, the product storage structure 350 is a retail display, which stores the products 352 for display to potential purchasers in a retail environment, such as a retail store. In other embodiments, the product storage structure 350 is an industrial or medical fixture for use in a work environment or a hospital. Yet other embodiments include a mobile product storage structure such as a rolling sales bag or a vehicle.

The products 352 can be of various types. In some embodiments, a product 352 is a lead-acid battery, such as an automotive or marine battery.

The product information tags 354 are configured to interact with the field device 102 to transmit product information to the field device 102. In some embodiments, the field device 102 is configured as a radio frequency identification (RFID) reader, and the product information tags 354 are RFID tags. In some embodiments, an RFID tag is physically affixed to each product 352, or to packaging for the product 352. A single RFID tag can be associated with multiple products 352 or contained within a single package. The RFID tag is of a type that can be read by the field device 102 as a RFID reader. The RFID tag can be passive, active, or semi-passive.

In some embodiments, the antennas 356 are RFID antennas that are used to propagate RF signals toward the products 352. The antennas 356 are arranged to aim the products 352 themselves or the product storage structure 350. The antennas 356 are of a type suitable for emitting and receiving RF signals to receive product identification information from the RFID tags 354 on the products 352. An example RFID antenna is EYE antenna available from Seeonic Inc., Plymouth, Minn.

Once installed, the field device 102 is operable to wirelessly detect the product information tags 354 on the products 352 stored in the product storage structure 350. For example, when RFID energy is incident upon the RFID tags, the RFID energy will be harvested and used to attenuate a reflected RFID signal back in the original antenna. The attenuated signal can include various pieces of information about one or more of the products 352, such as product UPC code, company code, and serial number, to provide up-to-date product inventory data. The field device 102 operates to process these RFID signals.

When the field device 102 detects the product information vis one or more RFID antennas 356, the field device 102 can operate to process the data as necessary and send it to a central system, such as to the server computing device 108, via a data network such as the Internet via wireless modalities such as cellular, Wi-Fi, ZigBee or Bluetooth, or wired modalities such as Ethernet or RS-232 serial connection.

The product inventory data can be collected and transmitted as frequently as desired, such as every second, minute, hour, 12 hours, day, week, month, quarter, year, etc., or any multiple thereof. The frequency can be chosen based in part on one or more of the following factors: (1) how frequently products are expected to be added or removed from the product storage structure 350, (2) the frequency at which product replenishment can occur, and (3) the desired battery life because increased frequency will result in decreased battery life.

The functional circuit 112 of the field device 102 operates to detect, and interact with, the product information tags 354 (e.g., RFID tags) on the products 352 via one or more RFID antennas 356, as well as to communicate product inventory data (including product identification information) through a data network such as the Internet via wireless modalities such as cellular, Wi-Fi, ZigBee or Bluetooth, or wired modalities such as Ethernet or RS-232 serial connection, to a central system, such as to the server computing device 108. The resulting data can be processed at the server computing device 108 before being transmitted to the field device user 106. The functional circuit 112 is illustrated and described in more detail with reference to FIG. 10.

Figure 10:
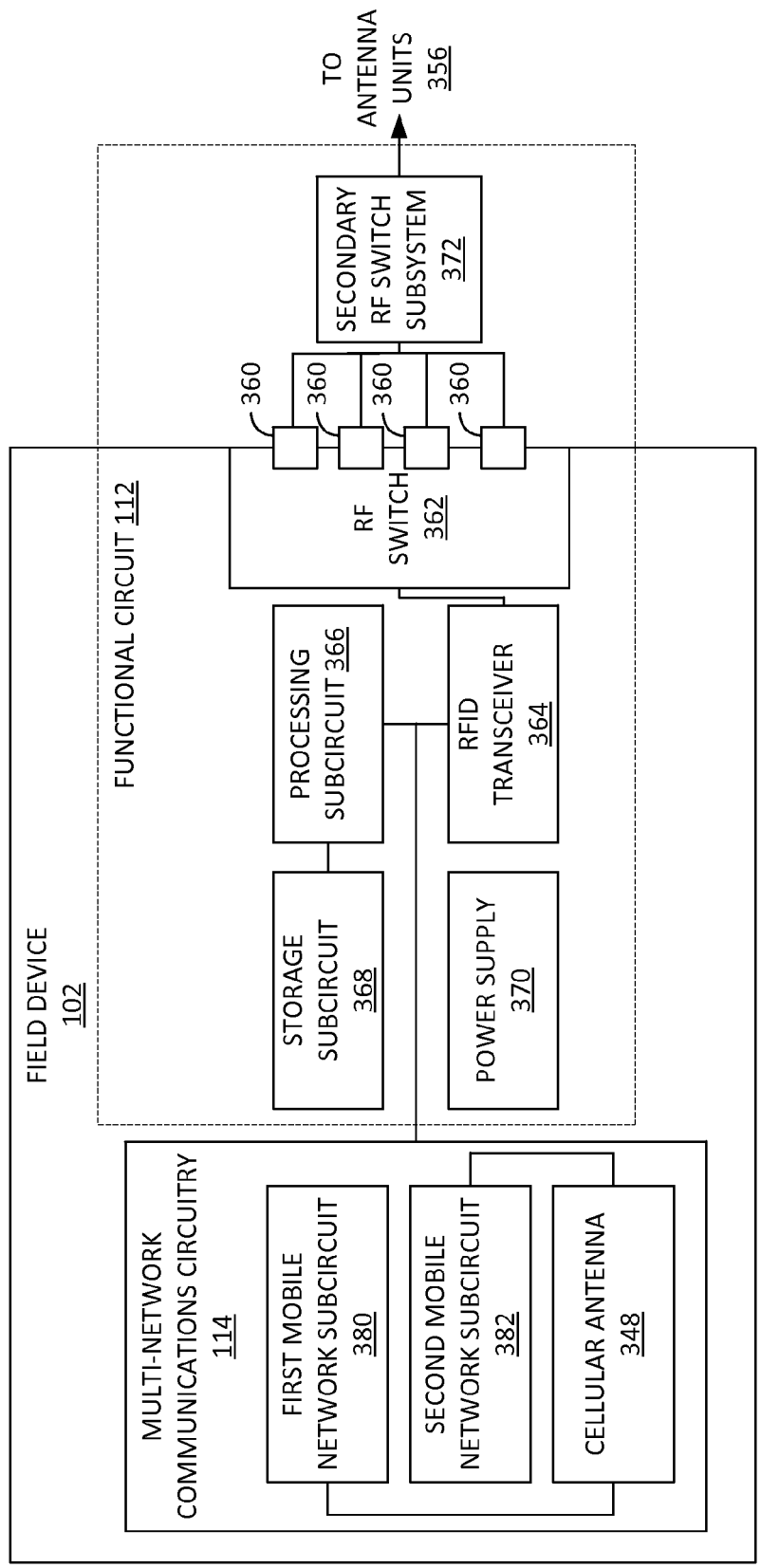
FIG. 10 is a schematic block diagram of an example field device.

FIG. 10 is a schematic block diagram of an example field device 102. In some embodiments, the functional circuit 112 of the field device 102 includes RF connectors 360, an RF switch 362, an RFID transceiver 364, a processing subcircuit 366, a storage subcircuit 368, a power supply 370. Also illustrated in FIG. 10 is a secondary RF switch device 372, which can be included within or exterior to a housing of the field device 102 in various embodiments.

The RF connectors 360 are configured to be connected to RF transmission lines connected to the antennas 356, either directly or via the secondary RF switch device 372. An example of the RF connector 360 is a coaxial cable connector. The conductors of the RF connectors 360 are electrically coupled to the RF switch 362.

The RF switch 362 is electrically coupled to the RF connectors 360 to communicate RF signals to and from the antenna 356. The RF switch 362 is controlled by the processing subcircuit 366. The RF switch 362 is also connected to the RFID transceiver 364 by a RF transmission line suitable for transmitting the RF signals therebetween. For example, the RF switch 362 is configured with low-insertion loss field-effect transistors made by Peregine Semiconductor of San Diego, Calif.

The RFID transceiver 364 operates under the control of the processing subcircuit 366 to generate and transmit RF signals to at least one of the antennas 356, and also to receive return RF signals from the product information tags 354. An example of the RFID transceiver 364 is M6e available from ThingMagic of Woburn, Mass., Vashon from Impinj of Seattle, Wash., or RU-861-0XX (from Microelectronics Technology of Hsinchu, Taiwan.

The processing subcircuit 366 controls the overall operation of the field device 102. The processing subcircuit 366 can include any one or more processing devices operable to execute program instructions, such as a processor, microprocessor, or microcontroller. A specific example of a suitable processing device is PIC32MX, a 32-bit central microcontroller, available from Microchip Technologies Inc. of Chandler, Ariz. In some embodiments the processing subcircuit 366 controls the field device 102 to execute various engines implemented thereon. A functional block diagram illustrating examples of such engines is illustrated and described with reference to FIG. 11.

The field device 102 also includes a storage subcircuit 368, which may be part of the processing subcircuit 366 or separate from the processing subcircuit 366. The storage subcircuit 368 is sometimes also referred to herein as memory or a memory storage device. An example of the storage subcircuit 368 is Random Access Memory (RAM), such as 16 Mbyte DRAM (e.g., MT45W8MW, available from Micron Technology, Inc. of Boise, Id.). Other embodiments of the storage subcircuit 368 include one or more of the computer readable storage devices described herein. Computer readable storage devices do not include communication media, such as transitory media that conduct signals on communication lines and cables.

The power supply 370 provides power to the various components of the field device 102. In some embodiments, the power supply 370 includes a battery charger that operates to charge the battery 158 when connected to an external power source, such as through the power adapter 160.

The secondary RF switch device 372 can be provided in some embodiments. RF signals can be passed through the secondary RF switch device 372. An example secondary RF switch device 372 is WideVision™ available from Seeonic Inc. of Plymouth, Minn.

With continued reference to FIG. 10, the multi-network communications circuitry 114 of the field device 102 includes a plurality of mobile network subcircuits. In the illustrated example, the multi-network communications circuitry 114 includes two circuits, such as a first mobile network subcircuit 380 and a second mobile network subcircuit 382. In other embodiments, however, the multi-network communications circuitry 114 includes more than two mobile network subcircuits adapted for different mobile network modes M.

The multi-network communications circuitry 114 is configured to selectively establish different mobile network modes M. For example, the first mobile network subcircuit 380 of the multi-network communications circuitry 114 is configured to establish a data transfer connection on the first mobile network mode M1, and the second mobile network subcircuit 382 of the multi-network communications circuitry 114 is configured to establish a data transfer connection on the second mobile network mode M2.

In this example, the multi-network communications circuitry 114 is a cellular communication device suitable for communicating data across one of cellular communication networks using different mobile technologies. In some embodiments, the multi-network communications circuitry 114 includes the first mobile network subcircuit 380 using a GSM technology and the second mobile network subcircuit 382 using a CDMA technology. An example of the multi-network communications circuitry 114 employs the PXS8 communications module available from Cinterion Wireless Modules GmbH of Munich Germany, which is capable of communicating on either a GSM or CDMA cellular network. In other embodiments, the multi-network communications circuitry 114 can use separate modules, such as the PHS8 (for GSM) and the PVS8 (for CDMA) communication modules available from Cinterion Wireless Modules GmbH of Munich Germany. The multi-network communications circuitry 114 is electrically coupled to (or at least in data communication with) and controlled by the processing subcircuit 366.

In some embodiments, the multi-network communications circuitry 114 is configured to switch between a first circuit mode and a second circuit mode. In the first circuit mode, the first mobile network subcircuit 380 is turned on and the second mobile network subcircuit 382 is turned off so that the first mobile network mode M1 is used to make a data transfer connection between the field device 102 and the server computing device 108. In the second circuit mode, the first mobile network subcircuit 380 is turned off and the second mobile network subcircuit 382 is turned on so that the second mobile network mode M2 is used to make a data transfer connection between the field device 102 and the server computing device 108.

The multi-network communications circuitry 114 is electrically connected to the cellular antenna 348 that is configured to establish communications with one or more available base stations 116 on at least one mobile network mode M. For example, each of the first and second mobile network subcircuits 380 and 382 is electrically connected to the cellular antenna 348 so that the cellular antenna 348 is used to establish a network communications by each of the first and second mobile network subcircuits 308 and 382. The cellular antenna 348 can be provided on-board. An example cellular antenna 348 is A10315 available from Antenova of Cambridge, UK.

Figure 11:
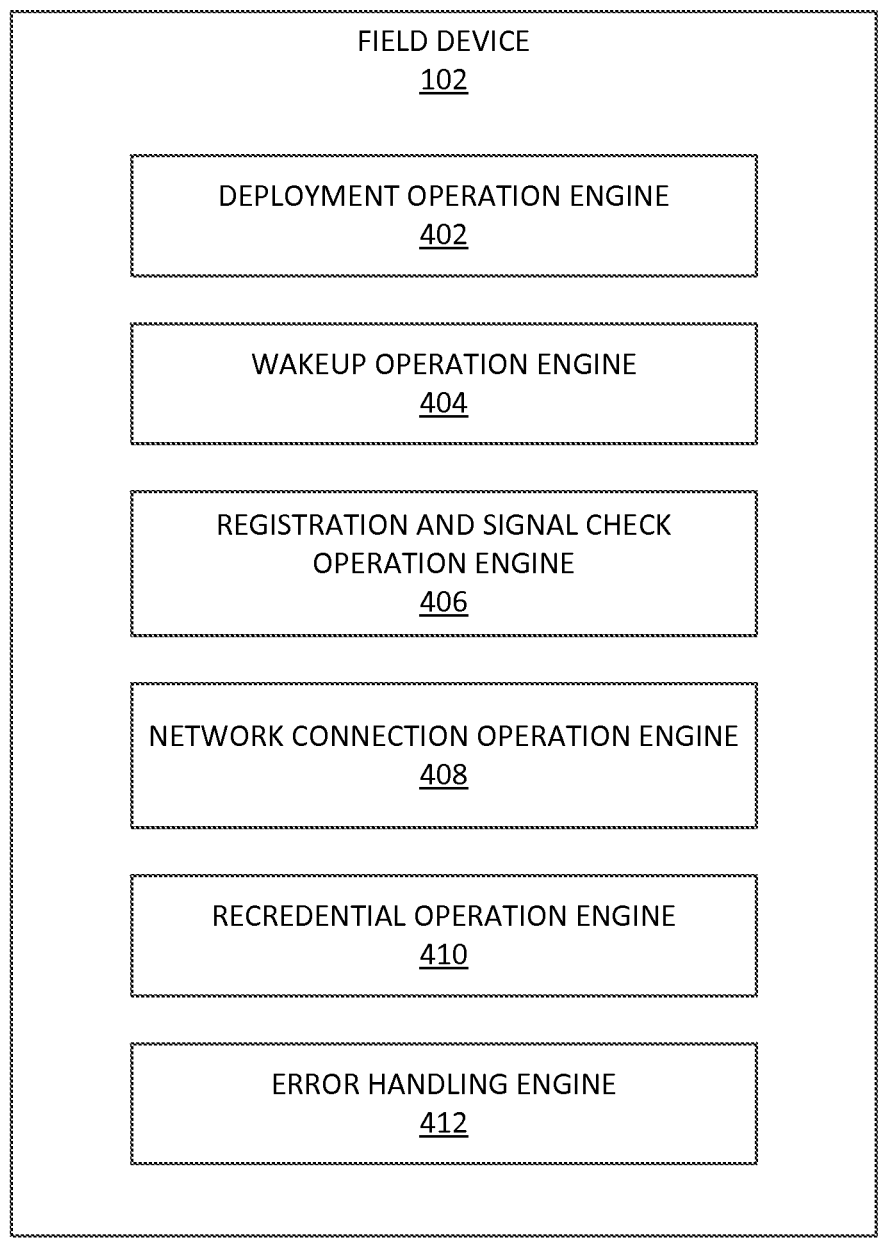
FIG. 11 illustrates example functional engines included in the field device.

FIG. 11 illustrates example functional engines included in the field device 102. In some embodiments, the field device 102 includes a deployment operation engine 402, a wakeup operation engine 404, a registration and signal check operation engine 406, a network connection operation engine 408, a recredential operation engine 410, and an error handling engine 412.

In some embodiments, the functional engines of the field device 102 including the engines 402, 404, 406, 408, 410, and 412 are implemented as firmware. Such firmware is configured to control how a mobile network mode is identified, selected, and prioritized. The firmware can be programmed within a microprocessor of the field device, and can be written in various languages, such as MIPS-32 assembly instructions and/or C programming language.

The deployment operation engine 402 operates to perform a deployment operation when the field device 102 is booted up in the field for the first time. In order for the field device 102 to obtain wireless connection to the server computing device 108, the field device 102 is required to successfully connect to a cellular carrier in one of different mobile network modes, such as GSM or CDMA technology modes. When the field device 102 is first installed in a desired place, the field device 102 has never attempted to establish connection to any mobile network modes M, and thus is not possible to know which mobile network mode M has the highest quality signal. In the deployment operation where the field device 102 is first turned on after installation, the deployment operation engine 402 operates to make an autonomous, in-field determination of signal quality for both of the mobile network modes M1 and M2, and intelligently decide which mobile network mode is the best without human intervention. In some situations, human intervention is not possible as those deploying remotely-operated devices, such as the field devices 102, are non-technical laborers. To send technicians to several, disparate locations where the devices are deployed would be logistically challenging and economically unfeasible. An example operation of the deployment operation engine 402 is described and illustrated in more detail with reference to FIG. 12.

The wakeup operation engine 404 operates to perform a wakeup operation when the field device 102 is powered back on in operation. In some embodiments, the field device 102 operates either in an inactive operation or in an active operation. In the inactive operation (e.g., a sleep mode or power saving mode), the field device 102 normally operates in a low power state, consuming for example as little as 100 uW. In the active operation, the field device 102 is in a higher power mode wherein the RFID transceiver 364 sends RF signals through the RF switch 362 that are connected to the RF connectors 360 (e.g., external RF ports). In some embodiments, the active operation is turned on when an internal real-time clock triggers a wakeup signal.

In some embodiments, the field device 102 is configured to switch between the inactive operation and the active operation in a programmed manner. For example, the field device 102 is programmed to change from the inactive operation to the active operation at a preset time or at preset intervals. In other embodiments, the inactive and active operations can be selected manually by a field operator.

When the field device 102 is switched from the inactive operation to the active operation, the field device 102 is configured to default to the previous mobile network mode that on which field device 102 has successfully communicated. For example, the field device 102 in the submissive mobile network connection regime 124 is configured to always attempt to first connect to the last successful mobile network mode M. The field device 102 always starts with the carrier account the field device 102 has successfully submitted to in the last time. This configuration can minimize the time that the field device 102 takes to obtain a mobile connection, and save energy used to operate the field device 102. The configuration also prevents the field device 102 from randomly cycling through various carrier accounts (i.e., different mobile network modes M) that are active. An example operation of the wakeup operation engine 404 is described and illustrated in more detail with reference to FIG. 13.

The registration and signal check operation engine 406 operates to perform a registration of the field device 102 when the field device 102 is not activated on a particular mobile network mode. Further, the registration and signal check operation engine 406 operates to check signal qualities and/or strengths from both of the mobile network modes M1 and M2. When the field device 102 is in operation in the field, the field device 102 not only communicates on one of the mobile network modes M1 and M2, to which the field device 102 submitted, but also monitors signal status (e.g., signal qualities and/or strengths) of both mobile network modes M1 and M2. The monitored signal status is reported back to the server computing device 108 to allow the server computing device 108 to analyze the changing signal characteristics (such as quality and/or strength) of the mobile network modes M1 and M2 and determine if and when the carrier accounts associated with the mobile network modes M1 and M2 need to be activated or deactivated for the subject field device 102 to obtain more reliable and/or economically-advantageous configuration under the criteria 330. An example operation of the registration and signal check operation engine 406 is described and illustrated in more detail with reference to FIG. 14.

The network connection operation engine 408 operates to perform a data transfer connection with the server computing device 108 through one of the mobile network modes M in a submissive mobile network connection regime 124. Under the submissive mobile network connection regime 124, the field device 102 autonomously operates to automatically submit to whichever mobile network mode M is activated. The activation status of carrier accounts associated with the mobile network modes M determines what carrier account the field device 102 utilizes without any external communications or asynchronous commands that involve a data transfer between the field device 102 and the server computing device 108, which can create complex race conditions. As such, the switching of mobile network modes M does not require the server computing device 108 or any other computing devices to interact with the field device 102. The submissive mobile network connection regime 124 allows machine-to-machine nodes, such as the field device 102, to consistently and reliably switch to different mobile network modes without coordinating commands between the respective mobile network operators, thereby eliminating the possibility of complex race conditions incurred when sending commands as well as the need to have the field device or the server computing device interact with the account management systems of a mobile network operator during the switching of a mobile network. An example operation of the network connection operation engine 408 is described and illustrated in more detail with reference to FIG. 15.

The recredential operation engine 410 performs a recredentialing process for the field device 102 when necessary. Where the field device 102 connects to the mobile network mode M using CDMA technologies, the activation of the field device 102 can be done as part of the pre-deployment operation 138, as illustrated in FIG. 2. However, after deployment of the field device 102, there can be a situation where the field device 102 needs to perform another activation process to obtain new credentials. For example, a new activation process (i.e., a recredentialing process) is required when cellular accounts are changed after the field device 102 is deployed in the field and has already been activated for the first time. An example operation of the recredential operation engine 410 is described and illustrated in more detail with reference to FIG. 20.

The error handling engine 412 operates to perform an error handling operation in various situations. The error handling operation verifies that, under the submissive mobile connection regime, the field device 102 has attempted to establish a network connection through both of the mobile network modes M1 and M2, before terminating the attempt for network connection to the server computing device 108. An example operation of the error handling engine 412 is described and illustrated in more detail with reference to FIG. 21.

Figure 12:
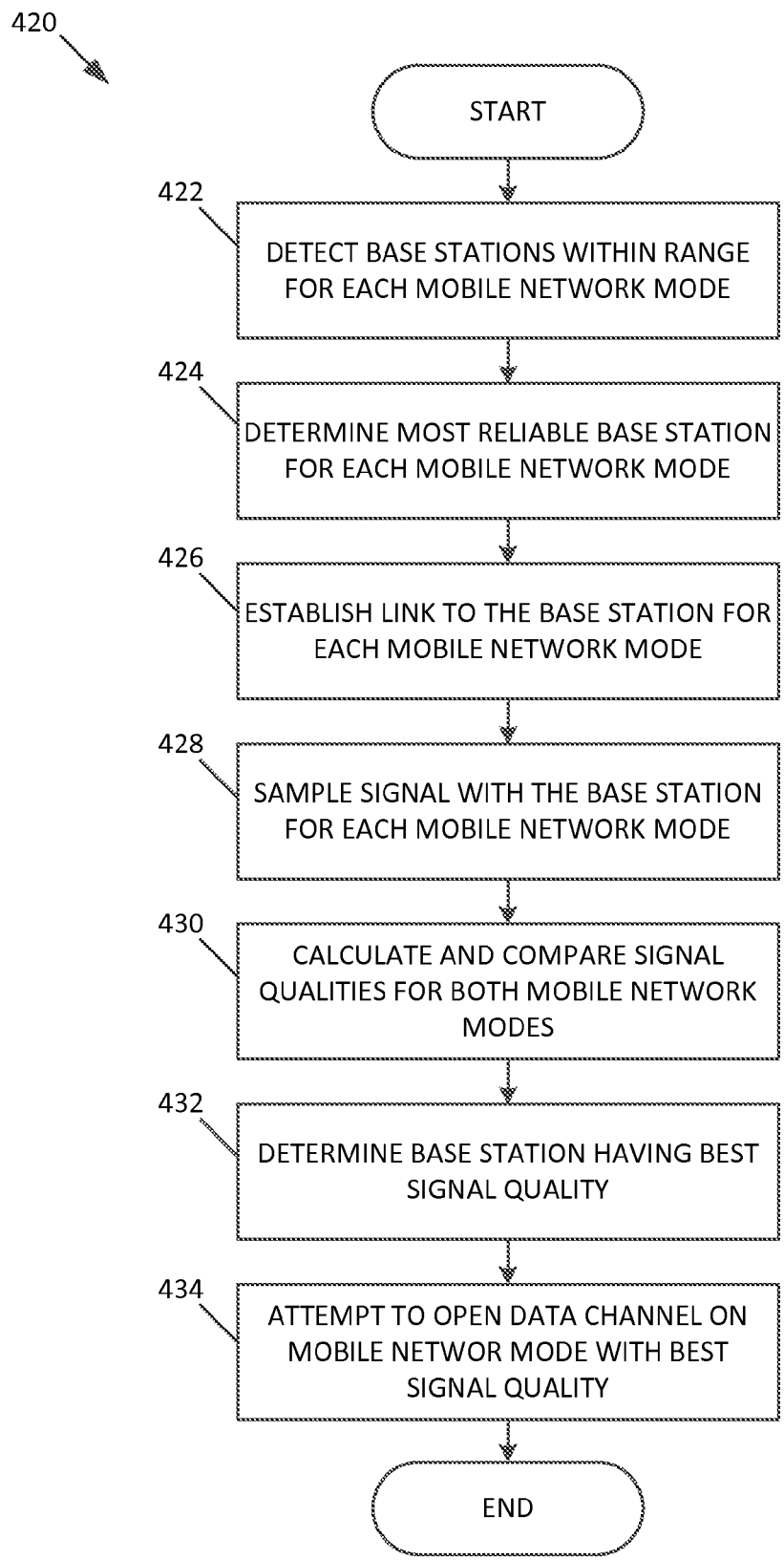
FIG. 12 is a flowchart illustrating an example method of operating a deployment operation engine.

FIG. 12 is a flowchart illustrating an example method 420 of operating the deployment operation engine 402. In some embodiments, the method 420 includes operations 422, 424, 426, 428, 430, 432, and 434.

The method 420 typically starts when the field device 102 is supplied power for the first time after the field device 102 is deployed in the field. The field device 102 operates to recognize its initial power-on state and can go through at least one of the following operations 422, 424, 426, 428, 430, 432, and 434.

During the following operations 422, 424, 426, 428, 430, 432, and 434, all carrier accounts associated with different mobile network modes M (including M1 and M2) remain activated so that the field device 102 finds a communications channel that is reliable. For most of the time, it is practically not possible to know the exact location where a field device 102 will be deployed in the field. Neither is it possible to know the precise availability or quality of a cellular signal within the vicinity where the field device is physically located. For these reasons, the field device is configured to have flexibility to connect to all available accounts for the deployment operation.

At the operation 422, the deployment operation engine 402 operates to detect base stations 116 within range for each of the different mobile network modes M (e.g., the first and second mobile network modes M1 and M2). In some embodiments, the deployment operation engine 402 performs a process of recording which base station 116 from different mobile network modes M1 and M2 are within range.

At the operation 424, the deployment operation engine 402 determines the most reliable base station 116 for each of the different mobile network modes M1 and M2. In some embodiments, the deployment operation engine 402 uses an internal device algorithm that determines which base station 116 is the most reliable among the base stations 116 in range for each of the first and second mobile network modes M1 and M2.

At the operation 426, the deployment operation engine 402 establishes a tower registration radio link to the most reliable base station 116 for each of the different mobile network modes M1 and M2.

At the operation 428, the deployment operation engine 402 operates to sample communication signals for both of the most reliable base stations 116 from the different mobile network modes M1 and M2. In some embodiments, the sampling of the signals is repeatedly performed.

At the operation 430, the deployment operation engine 402 operates to calculate and compare signal qualities of the sampled signals for both of the different mobile network modes M1 and M2. In some embodiments, the signals for the base stations 116 from the different mobile network modes M1 and M2 are sampled using a preset signal quality calculation algorithm. The signal quality calculation algorithm can be designed to enable a direct quantitative comparison between the signal for the first mobile network mode M1 (e.g., GSM signal) and the signal from the second mobile network mode M2 (e.g., CDMA signal).

In some embodiments, the signal quality algorithm uses received signal code power (RSCP), Ec/No (Energy per chip over spectral density of noise), SQual (Signal Quality) and SRxLev (Cell selection RX level value) metrics that are all custom-scaled to 0-100% values. This algorithm enables an end user to look at one quality percentage value for each signal, thereby making it easy to decide which signal is better.

As illustrated above, the sampled signals are compared based on their signal qualities, instead of signal strength. In some embodiments, using received signal strength indicator (RSSI) for each mobile network mode is not enough because these values are relative to the RF noise floor. Also, signal strength does not measure radio link intermittency.

At the operation 432, the deployment operation engine 402 determines a base station 116 that provides the best signal quality.

At the operation 434, the deployment operation engine 402 proceeds to attempt to open a data transfer channel on the mobile network mode M (e.g., either M1 or M2) via the selected base station 116.

Figure 13:
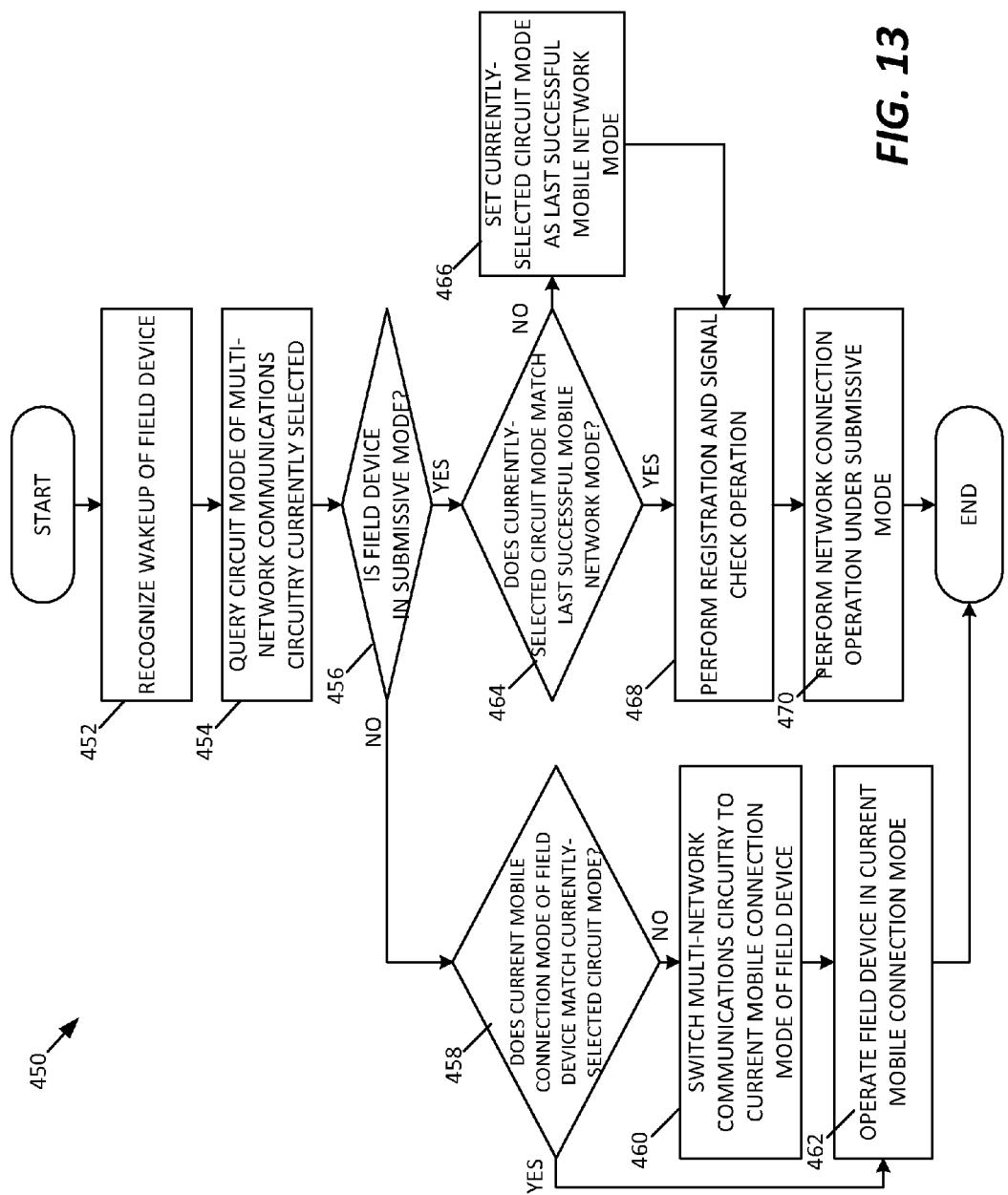
FIG. 13 is a flowchart illustrating an example method of operating a wakeup operation engine.

FIG. 13 is a flowchart illustrating an example method 450 of operating the wakeup operation engine 404. In some embodiments, the method 450 includes operations 452, 454, 456, 458, 460, 462, 464, 466, 468, and 470.

At the operation 452, the wakeup operation engine 404 first recognizes that the field device 102 wakes up from the inactive operation to the active operation.

At the operation 454, the wakeup operation engine 404 operates to query a circuit mode of the multi-network communications circuitry 114 that is currently selected. As described above, the multi-network communications circuitry 114 can be in either the first circuit mode or the second circuit mode. In some embodiments, when the multi-network communications circuitry 114 is in the first circuit mode, the first mobile network subcircuit 380 is active and the second mobile network subcircuit 382 is inactive. In the second circuit mode, the first mobile network subcircuit 380 can be inactive and the second mobile network subcircuit 382 can be active.

At the operation 456, the wakeup operation engine 404 determines whether the field device 102 is in the submissive mobile network connection regime 124. If the field device 102 is in the submissive mobile network connection regime 124, the method 450 moves on to the operation 464.

In addition to the submissive mobile network connection regime 124, the field device 102 can be in other mobile connection modes. In some embodiments, the field device 102 is configured to be connectable only to either the first mobile network mode M1 or the second mobile network mode M2. For example, the field device 102 can have a first mobile connection mode in which the field device 102 is connected only on the first mobile network mode M1 (e.g., a GSM connection only), a second mobile connection mode in which the field device 102 is connected only on the second mobile network mode M2 (e.g., a CDMA connection only), and the submissive mobile network connection regime 124 in which the field device 102 submits whichever mobile network mode is activated (e.g., submissive either to a GSM connection or a CDMA connection as available).

If the field device 102 is determined to be in a mobile connection mode other than the submissive mobile network connection regime 124, the method 450 moves on to the operation 458.

At the operation 458, the wakeup operation engine 404 determines whether the current mobile connection mode of the field device 102 matches the circuit mode of the multi-network communications circuitry 114 currently selected. If the current mobile connection mode of the field device 102 matches the current circuit mode of the multi-network communications circuitry 114, the field device 102 is ready to establish a data transfer connection on a mobile network mode M associated with the current mobile connection mode of the field device 102. If not, the circuit mode of the multi-network communications circuitry 114 needs to be changed to meet the current mobile connection mode of the field device 102. If it is determined that the current mobile network mode of the field device 102 is the same as the circuit mode of the multi-network communications circuitry 114, the method 450 moves on to the operation 462. Otherwise, the method 450 continues on to the operation 460.

At the operation 460, the wakeup operation engine 404 operates to switch the circuit mode of the multi-network communications circuitry 114 to match the current mobile connection mode of the field device 102.

At the operation 462, the field device 102 is ready to operate in the current mobile connection mode. If the current mobile connection mode is the first mobile connection mode, the field device 102 can establish a data transfer connection on the first mobile network mode M1. If the current mobile connection mode is in the second mobile connection mode, the field device 102 can make a data transfer connection on the second mobile network mode M2.

At the operation 464, the wakeup operation engine 404 determines whether the currently selected circuit mode of the multi-network communications circuitry 114 matches the mobile network mode M that was successfully used previously ("a previous mobile network mode"). If it is determined that the circuit mode of the multi-network communications circuitry 114 does not match the last successful mobile network mode M, the method 450 moves on to the operation 466. Otherwise, the method 450 continues on to the operation 468.

At the operation 466, the wakeup operation engine 404 operates to set the currently-selected circuit mode of the multi-network communications circuitry 114 to match last successful mobile network mode M. The field device 102 is then ready to establish a data transfer connection on the mobile network mode M that was successful in the last time.

At the operation 468, the wakeup operation engine 404 performs a registration and signal check operation. An example of the registration and signal check operation is illustrated and described with reference to FIG. 14.

At the operation 470, the wakeup operation engine 404 performs a network connection operation under the submissive mobile network connection regime 124. An example of the network connection operation under the submissive mobile network connection regime 124 is illustrated and described with reference to FIG. 15.

Figure 14:
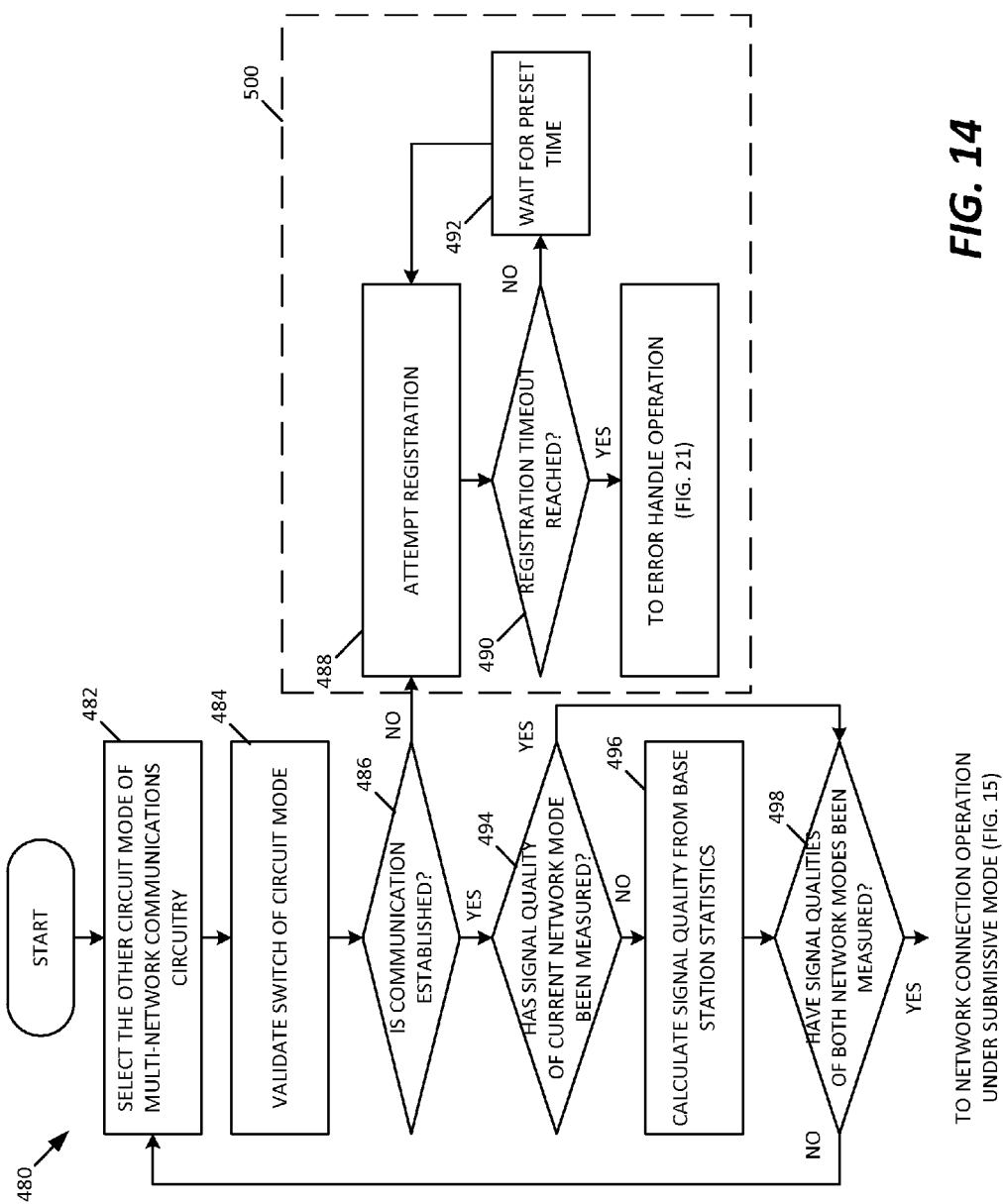
FIG. 14 is a flowchart illustrating an example method of operating a registration and signal check operation engine.

FIG. 14 is a flowchart illustrating an example method 480 of operating the registration and signal check operation engine 406. In some embodiments, the method 480 includes operations 482, 484, 486, 488, 490, 492, 494, 496, and 498.

At the operation 482, the registration and signal check operation engine 406 operates to select the other circuit mode of the multi-network communications circuitry 114. By way of example, if the multi-network communications circuitry 114 has been set as the first circuit mode to switch on the first mobile network subcircuit 380 and switch off the second mobile network subcircuit 382, it is now changed to the second circuit mode to switch off the first mobile network subcircuit 380 and switch back on the second mobile network subcircuit 382. As a result, the field device 102 is now ready for establishing a network connection on the second mobile network mode M2 by operation of the second mobile network subcircuit 382.

At the operation 484, the registration and signal check operation engine 406 operates to validate the change of the circuit mode of the multi-network communications circuitry 114. In some embodiments, the error handing operation (FIG. 21) by the error handling engine 412 will be performed if the validation of the switch of the circuit mode fails.

At the operation 486, the registration and signal check operation engine 406 determines whether the field device 102 has established a network connection (i.e., registration) on a mobile network mode M (either M1 or M2) by operation of the network subcircuit of the multi-network communications circuitry 114 that was selected and validated in the operations 482 and 484. In the above example illustrated in the operation 482, it is determined whether the field device 102 can establish a network connection on the second mobile network mode M2 by operation of the second mobile network subcircuit 382. If the network connection can be established (i.e., if the field device 102 has already been registered on the selected mobile network mode M), the method 480 continues on to the operation 494.

If it is determined that the network connection cannot be established, a registration of the field device 102 is required to be able to establish communications on an associated mobile network mode M. In some embodiments, a registration subroutine 500 is performed including the operations 488, 490, and 492. Accordingly, the method 480 moves on to the operation 488.

At the operation 488, the registration and signal check operation engine 406 attempts to register the field device 102 to the mobile network operator 104 of the associated mobile network mode M (either M1 or M2).

At the operation 490, the registration and signal check operation engine 406 determines whether a registration timeout has been reached. If it has not reached the timeout, the method 480 continues on at the operation 492. Otherwise, the error handling operation (FIG. 21) can be performed by the error handling engine 412.

At the operation 492, the registration and signal check operation engine 406 operates to wait for a preset amount of time, and moves back to the operation 488 to attempt the registration again.

At the operation 494, the registration and signal check operation engine 406 determines whether a signal quality of the current mobile network mode M has been measured. If the signal quality has been measured, the method 480 moves on to the operation 498. If not, the method 480 continues at the operation 496.

At the operation 496, the registration and signal check operation engine 406 operates to calculate a signal quality of the current mobile network mode M from a statistics regarding an associated base station 116.

At the operation 498, the registration and signal check operation engine 406 determines whether signal qualities of both of the mobile network modes M1 and M2 have been measured. If both of the signal qualities have not been measured, the method 480 moves back to the operation 482 to repeat the entire operations in the method 480 as described above. If both of the signal qualities have been measured, the network connection operation under the submissive mobile network connection regime 124 will then be performed (FIG. 15).

Prior to moving on to the network connection operation under the submissive mobile network connection regime 124, the operations in the method 480 are typically repeated twice. For example, the operations in the method 480 is performed once for each of the mobile network modes, regardless of which mobile network mode is ultimately used to create an operative data transfer channel. As a result, after the repetition, the circuit mode of the multi-network communications circuitry 114 is selected back to match the last successful mobile network mode M.

Figure 15:
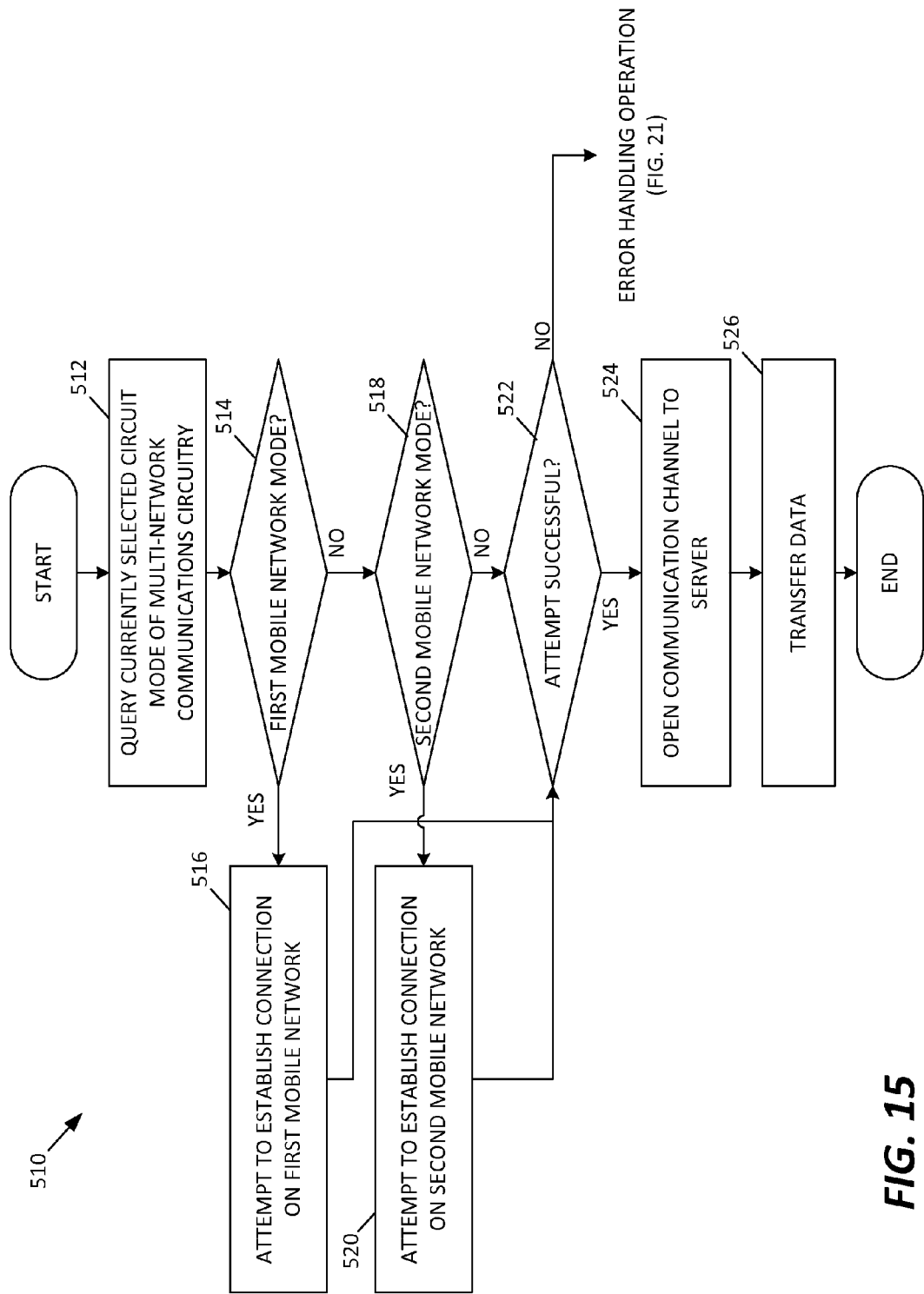
FIG. 15 is a flowchart illustrating an example method of operating a network connection operation engine.

FIG. 15 is a flowchart illustrating an example method 510 of operating the network connection operation engine 408. In some embodiments, the method 510 includes operations 512, 514, 516, 518, 520, 522, 524, and 526. The method 510 is performed in the submissive mobile network connection regime 124.

At the operation 512, the network connection operation engine 408 operates to query the currently selected circuit mode of the multi-network communications circuitry 114.

At the operation 514, the network connection operation engine 408 determines whether the currently selected circuit mode of the multi-network communications circuitry 114 is the first circuit mode for making a network connection on the first mobile network mode M1. If it is determined that the currently selected circuit mode of the multi-network communications circuitry 114 is the first circuit mode ("YES" at the operation 514), the network connection operation engine 408 operates to attempt to establish a network connection on the first mobile network mode M1 at the operation 516, and the method 510 moves on to the operation 522. An example of the operation 516 is described in more detail with reference to FIGS. 16 and 17. If it is determined that the currently selected circuit mode of the multi-network communications circuitry 114 is not the first circuit mode ("NO" at the operation 514), the method 510 moves on to the operation 518.

At the operation 518, the network connection operation engine 408 determines whether the currently selected circuit mode of the multi-network communications circuitry 114 is the second circuit mode for making a network connection on the second mobile network mode M2. If it is determined that the currently selected circuit mode of the multi-network communications circuitry 114 is the second circuit mode ("YES" at the operation 518), the network connection operation engine 408 operates to attempt to establish a network connection on the second mobile network mode M2 at the operation 520, and the method 510 moves on to the operation 522. An example of the operation 520 is described in more detail with reference to FIGS. 16 and 17. If it is determined that the currently selected circuit mode of the multi-network communications circuitry 114 is not the second circuit mode ("NO" at the operation 518), the method 510 moves on to the operation 522.

At the operation 522, the network connection operation engine 408 determines whether the attempt to establish a network connection on either the first or second mobile network mode M1 or M2 has been successful. If not ("NO" at the operation 522), the error handing operation (FIG. 21) can be performed. If it is determined that the attempt was successful ("YES" at the operation 522), the method 510 continues on at the operation 524.

At the operation 524, the network connection operation engine 408 operates to open a communication channel to the server computing device 108 through a mobile network mode M (either M1 or M2) on which a network connection was successfully established. An example of the operation 524 is described in more detail with reference to FIG. 18.

At the operation 526, the network connection operation engine 408 then operates to transfer data 122 between the field device 102 and the server computing device 108. In some embodiments, the transfer of data 122 fails, the error handling operation (FIG. 21) can be performed by the error handling engine 412. An example of the operation 526 is described in more detail with reference to FIG. 19.

Figure 16:
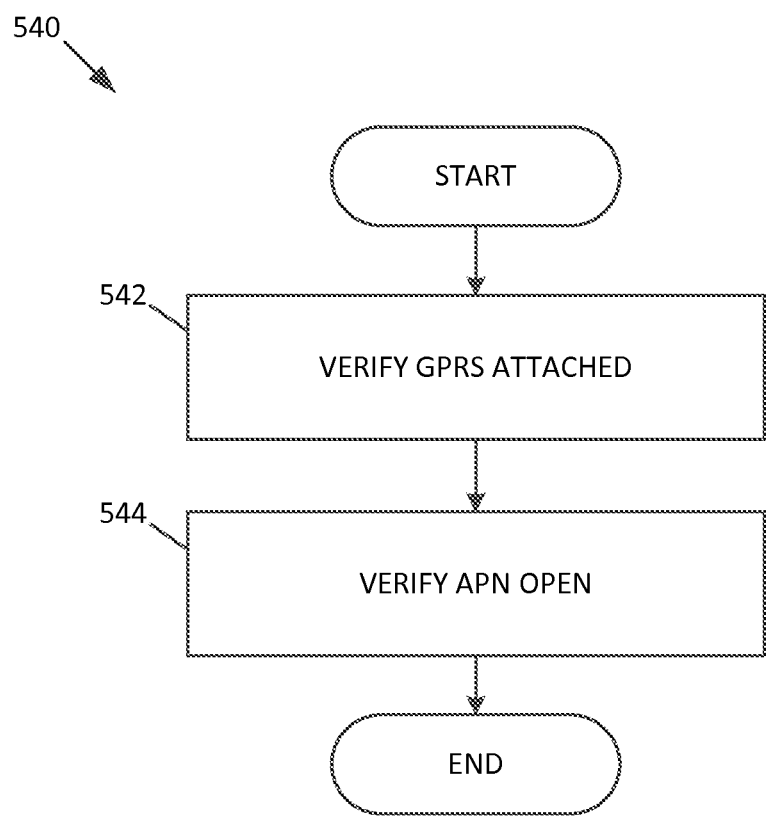
FIG. 16 is a flowchart illustrating an example method of attempting to establish a network connection on a mobile network mode using a GSM technology.

FIG. 16 is a flowchart illustrating an example method 540 of performing one of the operations 516 and 520 of FIG. 15. In some embodiments, the method 540 includes operations 542 and 544.

In the illustrated example of FIG. 16, the method 540 is designed to attempt to establish a network connection on a mobile network mode M using a GSM technology. Further, as described above with respect to the pre-deployment testing 138, a SIM card has been inserted into an associated slot of the field device 102 to activate the field device 102 with relevant credentials.

At the operation 542, the field device 102 operates to verify that a general packet radio service (GPRS) has been attached.

At the operation 544, the field device 102 operates to verify an access point name (APN) is open.

If either of the verifications fails at the operations 524 and 526, the error handing operation (FIG. 21) can be performed by the error handling engine 412.

Figure 17:
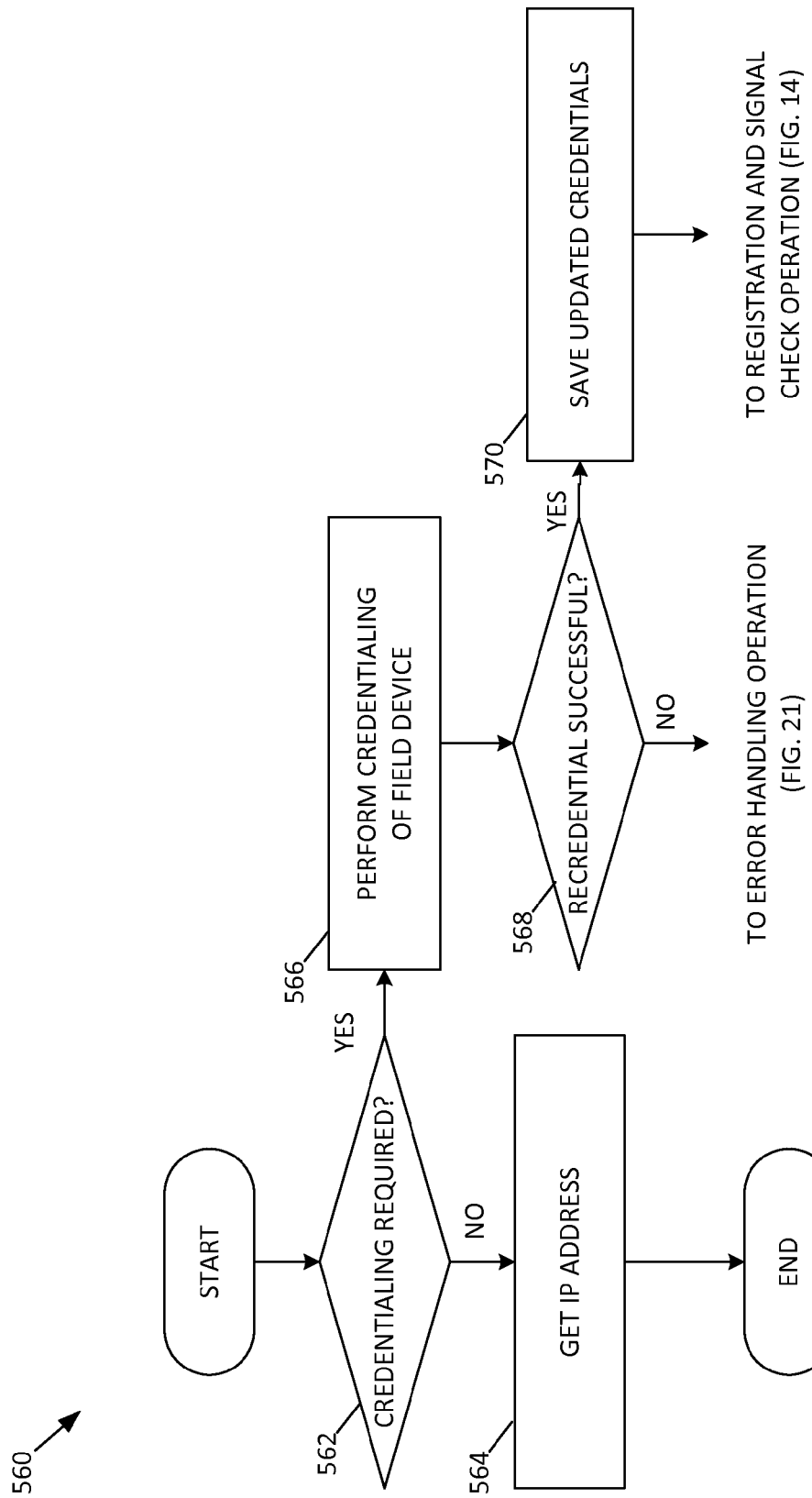
FIG. 17 is a flowchart illustrating an example method of attempting to establish a network connection on a mobile network mode using a CDMA technology.

FIG. 17 is a flowchart illustrating an example method 560 of performing the other of the operations 516 and 520 of FIG. 15. In some embodiments, the method 560 includes operations 562, 564, 566, 568, and 570.

In the illustrated example of FIG. 17, the method 560 is designed to attempt to establish a network connection on a mobile network mode M using a CDMA technology.

At the operation 562, the field device 102 determines whether a credentialing of the field device 102 is required on the CDMA mobile network mode. As described above, the field device 102 needs to communicate with a special server to get credential information over-the-air (OTA) for a CDMA technology network connection. In some embodiments, the OTA activation can be performed as part of the pre-deployment testing 138. In other embodiments, the OTA activation can be performed in other stages. The operation 562 is performed to check whether the OTA activation has been performed for the field device 102 on the CDMA technology mobile network mode.

If it is determined that the credentialing (i.e., activation) of the field device 102 is not required ("NO" at the operation 562), the operation 564 is performed to get an IP address to open a data transfer channel to the server computing device 108.

If it is determined that the credentialing (i.e., activation) of the field device 102 is required ("YES" at the operation 562), the method 560 moves on to the operation 566 to perform credentialing of the field device 102.

At the operation 568, the field device 102 determines whether the credentialing is successful. If it is successful ("YES" at the operation 568), the updated credentials are saved at the operation 570 and the field device 102 is activated and ready to perform the registration and signal check operation as illustrated in FIG. 14.

If the credentialing is not successful ("NO" at the operation 568), the error handling operation (FIG. 21) can be performed by the error handling engine 412.

Figure 18:
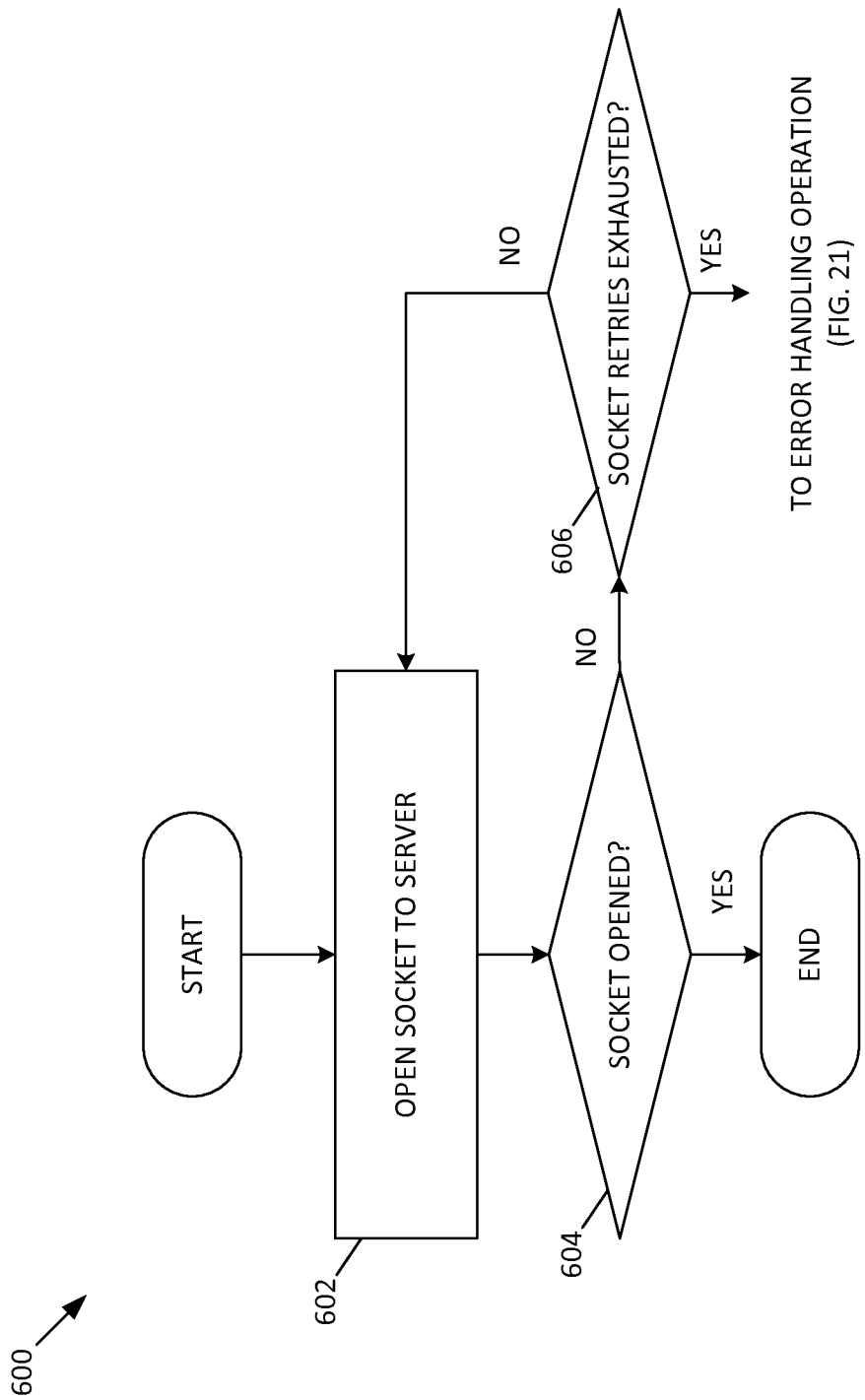
FIG. 18 is a flowchart illustrating an example method of opening a communication channel to a server computing device through one of mobile network modes.

FIG. 18 is a flowchart illustrating an example method 600 of performing the operation 524 of FIG. 14. In some embodiments, the method 600 includes operations 602, 604, and 606.

The method 600 is designed to open a communication channel to the server computing device 108 through one of the mobile network modes M (either M1 or M2).

At the operation 602, the field device 102 attempts to open a socket to the server computing device 108.

At the operation 604, the field device 102 determines whether the socket has been opened. If the socket is open ("YES" at the operation 604), the method 600 of opening a communication channel is complete.

If it is determined that the socket is not open ("NO" at the operation 606), the field device 102 determines whether the attempt to open the socket has been retried predetermined times. If the predetermined number of retries has exhausted ("YES" at the operation 606), the error handling operation (FIG. 21) can be performed by the error handling engine 412. Otherwise ("NO" at the operation 606), the method 600 returns to the operation 602 to repeat the operations in the method 600.

FIG. 19 illustrates an example structure of the data 122 that are transferred from the field device 102 to the server computing device 108 in the operation 526 of FIG. 14. In some embodiments, the data 122 includes network connection data 620 including signal status data 622 and the field device status data 624, and field device collected data 626.

The data 122 can be incorporated into the criteria 330 and used in managing various carrier accounts associated different mobile network modes M.

The network connection data 620 contain various pieces of information about mobile network connections established between the field device 102 and the server computing device 108 via associated base stations 116, and signal data thereof.

The signal status data 622 include information about signals from network connections on the mobile network modes M. In some embodiments, the signal status data 622 contain signal qualities monitored by the registration and signal check operation engine 406 as described above. In other embodiments, the signal status data 622 include RSSI, and complex field device-calculated signal strengths of the mobile network modes M.

The field device status data 624 include information about a health and status of the field device 102, such as battery voltage, device circuit board temperature, ambient temperature, and relative humidity. In some embodiments, the field device status data 624 are used for the server computing device 108 to control the field device 102.

The field device collected data 626 are data collected and/or generated by the field device 102 when the field device 102 performs its intended functions. In the illustrated example of FIGS. 9 and 10, the field device collected data 626 include inventory data of the products 352.

Figure 20:
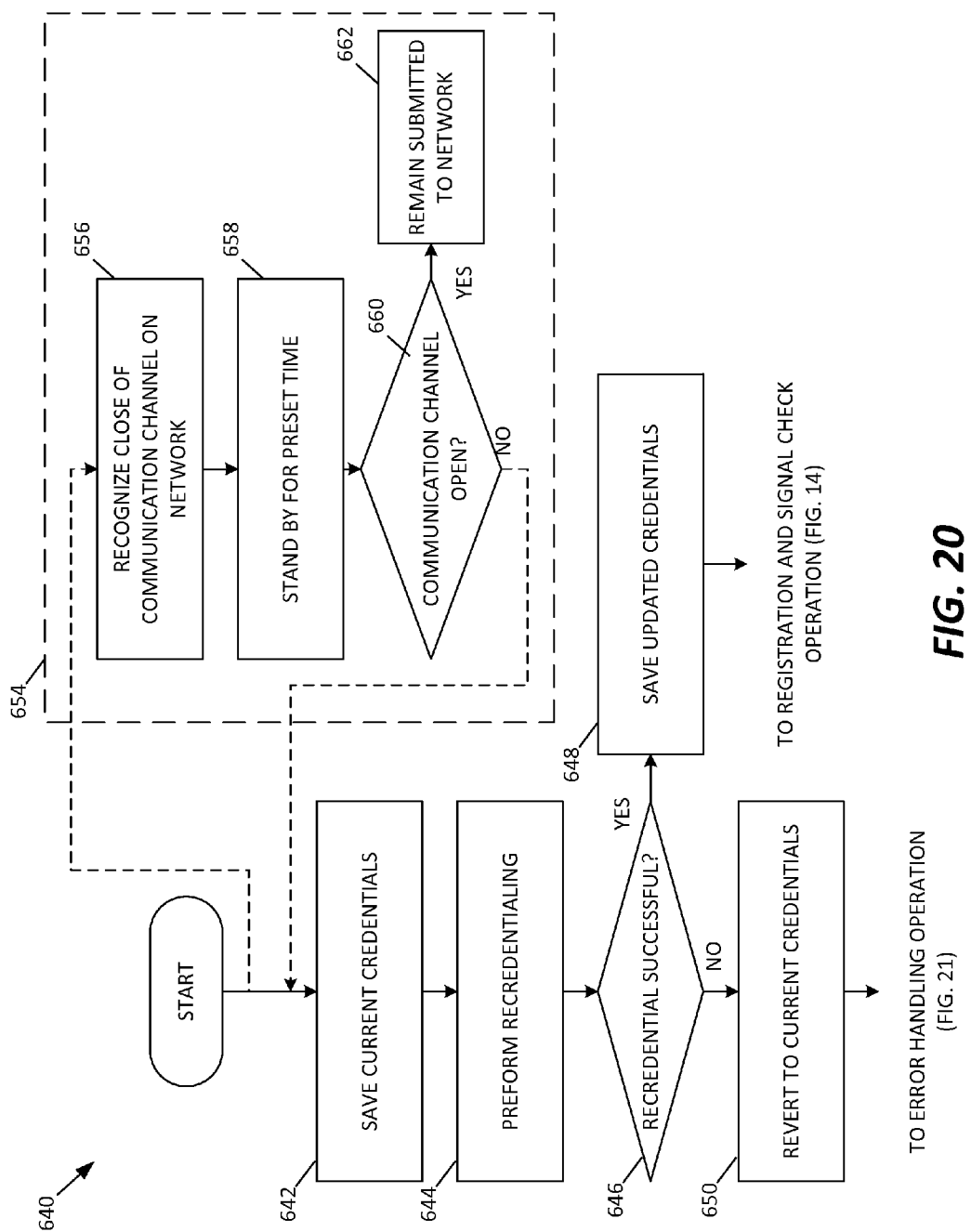
FIG. 20 is a flowchart illustrating an example method of operating a recredential operation engine.

FIG. 20 is a flowchart illustrating an example method 640 of operating the recredential operation engine 410. In some embodiments, the method 640 includes operations 642, 644, 646, 648, and 650.

A recredential operation can be performed when the field device 102 uses a CDMA technology mobile network mode M. The recredential operation engine 410 operates to reactivate the field device 102 with update credentials when necessary. For example, after deployment of the field device 102, there can be a situation where the field device 102 needs to perform another activation process to obtain new credentials. For example, a new activation process (i.e., a recredentialing process) is required when cellular accounts are changed after the field device 102 is deployed in the field and has already been activated for the first time.

At the operation 642, when the recredential operation engine 410 recognizes that the field device 102 needs to be reactivated with new credentials, the recredential operation engine 410 saves the existing credentials. The saved credentials can be used when the recredentialing fails.

At the operation 644, the recredential operation engine 410 performs recredentialing of the field device 102. The recredentialing process is the same as the credential process as described above (e.g., an OMADM process).

At the operation 646, the recredential operation engine 410 determines whether the recredentialing process is successful. If the recredential process is successful ("YES" at the operation 646), the field device 102 saves updated credentials at the operation 648 and submits to the mobile network mode M on which the field device 102 is reactivated with the updated credentials. The registration and signal check operation will then be performed as illustrated in FIG. 14.

If the recredential process fails ("NO" at the operation 646), the field device 102 is configured to revert to the existing credentials at the operation 650 and remain submitted as before. In some embodiments, the error handling operation (FIG. 21) can be performed.

In some embodiments, the method 640 including the operations 642, 644, 646, 648 and 650 is performed with a time delay subroutine 654. In some embodiments, the time delay subroutine 654 includes operations 656, 658, 660, and 662.

For example, the field device 102 is not typically capable of recognizing a difference between when a base station 116 is temporarily down or under maintenance and when a carrier account has been modified or moved. To solve this problem, the recredential operation engine 410 operates the field device 102 to wait for a certain period of time (e.g., 12 hours) until the base station 116 comes back online. If the field device 102 still fails on a network connection, the field device 102 is configured to receive new credentials and performs the operations 642, 644, 646, 648 and 650.

At the operation 656, the field device 102 (e.g., the recredential operation engine 410 thereof) recognizes that the current communication channel on the mobile network mode M is closed.

At the operation 658, the field device 102 is configured to stand by (e.g., in the inactive operation) for a preset time (e.g., 12 hours).

At the operation 660, the field device 102 determines whether the communication channel comes back on. If the channel is still off ("NO" at the operation 660), the method 640 moves on to the operation 642 and performs a series of operations as described above. Otherwise ("YES" at the operation 660), the field device 102 remains submitted to the original mobile network mode M at the operation 662.

As such, the recredentialing process of the recredential operation engine 410 allows the field device 102 to not only submit to a carrier account based on its activation status, but also automatically submit to whichever credentials have changed within the carrier account without any other external device communication or asynchronous commands that can lead to complex race conditions.

Figure 21:
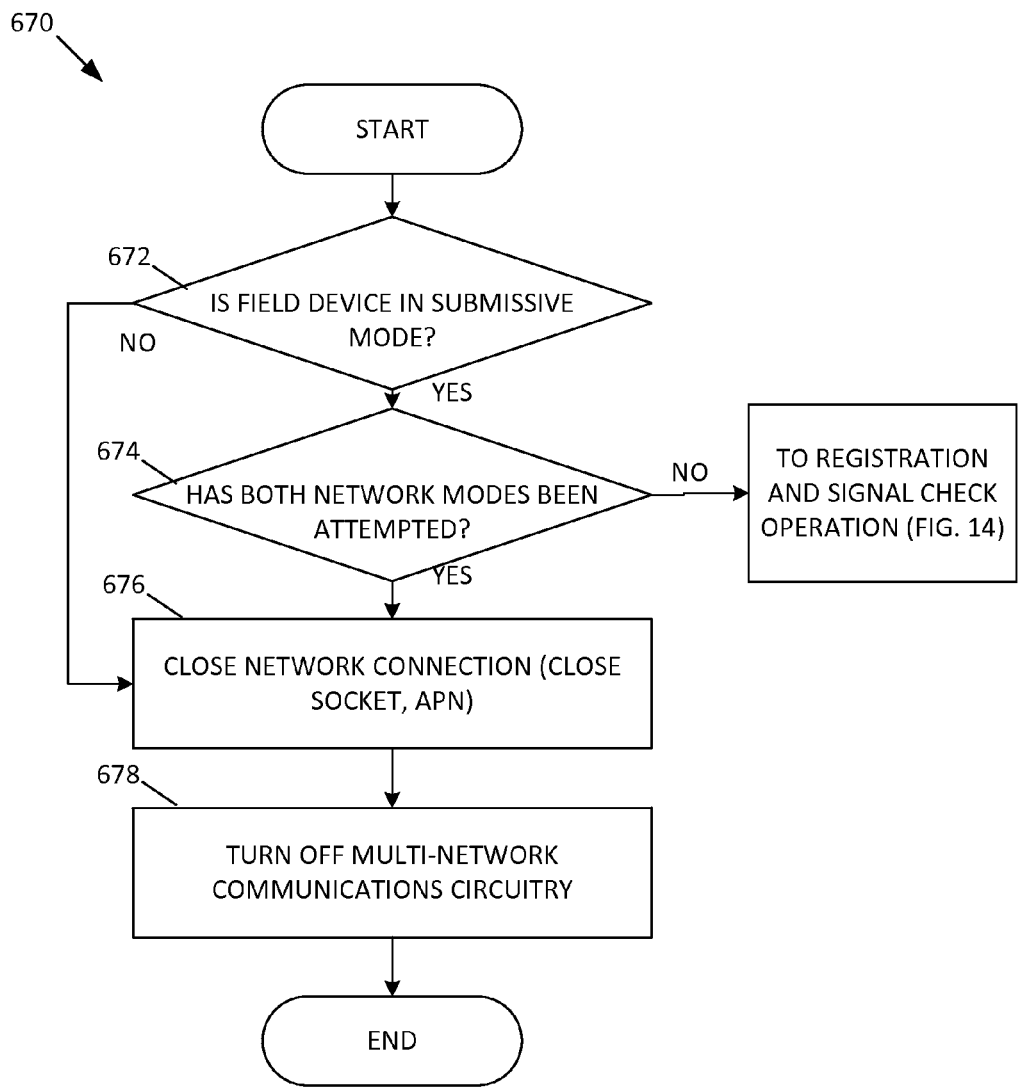
FIG. 21 is a flowchart illustrating an example method of operating an error handling engine.

FIG. 21 is a flowchart illustrating an example method 670 of operating the error handling engine 412. In some embodiments, the method 670 includes operations 672, 674, 676, and 678.

The error handling engine 412 operates to perform an error handling operation in various situations. The error handling operation verifies that, under the submissive mobile connection regime, the field device 102 has attempted to establish a network connection through both of the mobile network modes M1 and M2, before terminating the attempt for network connection to the server computing device 108.

At the operation 672, the error handling engine 412 determines whether the field device 102 is in the submissive mobile network connection regime 124. If the field device 102 is not in the submissive mobile network connection regime 124 (e.g., either in the first mobile connection mode or the second mobile connection mode) ("NO" at the operation 672), then the method 670 moves on to the operation 676. Otherwise ("YES" at the operation 674), the method 670 continues at the operation 674.

At the operation 674, the error handling engine 412 determines whether both of the mobile network modes M1 and M2 have been attempted. If it is determined that at least one of the mobile network modes M1 and M2 has not been attempted ("NO" at the operation 674), the registration and signal check operation is performed as illustrated in FIG. 14. Otherwise ("YES" at the operation 674), the method 670 continues at the operation 676.

At the operation 674, the existing network connection is closed. For example, the socket and APN are closed.

At the operation 676, the multi-network communications circuitry 114 is turned off so that there is no network connection on the mobile network modes M. As a result, the field device 102 can enter into the inactive operation.

In the illustrated example of FIG. 10-21, it is primarily described that the field device 102 operates in a situation where there are two mobile network modes M1 and M2, which use different mobile network technologies, such as GSM and CDMA. In other embodiments, however, the field device 102 operates in other situations, such as where there are two mobile network modes that use the same mobile technology but are provided by different mobile network operators 104 (e.g., two GSM technology mobile network modes operated by AT&T and T-Mobile, or two CDMA technology mobile network modes operated by Sprint and Verizon). In yet other embodiments, there can be more than two mobile network modes M, which are distinguished by either mobile technologies or mobile network operators, or both (e.g., four mobile network modes, two of which are GSM technology mobile network modes provided by AT&T and T-Mobile, and the other two of which are CDMA technology mobile network modes provided by Sprint and Verizon). The field device user 106 can still select the most economical and/or the most reliable account based on the criteria 330, and when the field device 102 is in the submissive mobile network connection regime 124, the field device 102 operates to submit to whichever mobile network mode is activated.

Typically, the field device user 106 wants to have only one carrier account active for each field device 102 to save on cellular carrier expenses. In other embodiments, however, the field device 102 in the submissive mobile network connection regime 124 can allow the field device user 106 to have multiple carrier accounts active at the same time to improve connectivity for the field device 102.

By way of example, a particular field device 102 can historically have reliable connection on both the first and second mobile network modes M1 and M2. If the rate for the first mobile network mode M1 is lower than the rate for the second mobile network mode M2, the field device user 106 could deactivate the account of the second mobile network operator 104B to save money while the account of the first mobile network operator 104A is activated to allow the first mobile network mode M1. However, since the field device 102 frequently misses signals periodically in recent weeks, the field device user 106 decides to deactivate the carrier account of the second mobile network operator 104B and activate the carrier account of the first mobile network operator 104A. Then, the field device 102 will automatically submit to the first mobile network mode M1. However, when it appears that the first mobile network mode M1 also causes a signal problem on the field device 102, the field device user 106 can now decide to active both of the carrier accounts for the first and second mobile network modes M1 and M2. In this configuration, the field device 102 can immediately try and automatically submit to whichever mobile network mode provides a stable signal.

As such, the submissive mobile network connection regime of the field device 102 operates on the status of an individual carrier account, the field devices 102 can operate per custom-tailored connection strategies. This allows for the flexibility of a customer (e.g., the field device user 106) to spend more funds on field devices that need extra connectivity while continuing to spend less on field devices that don't need such extra coverage.

The various examples and teachings described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A method of automatically selecting one of a plurality of mobile network modes, the method comprising: storing, in at least one field device, information about a previous mobile network mode, the previous mobile network mode being one of the plurality of mobile network modes through which an operable data transfer connection has previously been established with a server computing device; attempting to establish a data transfer connection with the server computing device on the previous mobile network mode using the information about the previous mobile network; monitoring whether the data transfer connection is established with the server computing device on the previous mobile network mode; when the data transfer connection is not established, attempting to establish a data transfer connection with the server computing device on another of the plurality of mobile network modes; and when the data transfer connection is established with the server computing device on any one of the plurality of mobile network modes, stopping the attempt to establish a data transfer connection with the server computing device on others of the plurality of mobile network modes.

2. The method of claim 1, further comprising: storing information about the previous mobile network mode if the attempt fails to establish a data transfer connection with the server computing device on one of the other mobile network modes.

3. The method of claim 1 wherein the plurality of mobile network modes includes a first mobile network mode and a second mobile network mode different from the first mobile network mode.

4. The method of claim 3, wherein the first mobile network mode employs a Global System for Mobile Communications (GSM) technology.

5. The method of claim 4, wherein the second mobile network mode employs a Code Division Multiple Access (CDMA) technology.

6. The method of claim 3, further comprising:
establishing communications on the first and second mobile network modes; and
measuring signal qualities of the first and second mobile network modes on the field device.

7. The method of claim 6, further comprising:
if the data transfer connection is established with the server computing device on any of the mobile network modes, transferring data of the signal qualities of the first and second mobile network modes to the server computing device.

8. The method of claim 7, further comprising:
if the field device has been activated for the first time, measuring the signal qualities of the first and second mobile network modes and attempting to establish a data transfer connection on one of the first and second mobile network that has a better signal quality.

9. The method of claim 3, further comprising:
setting a multi-network communications circuitry of the field device to match the previous mobile network mode, the multi-network communications circuitry configured to selectively establish communications in either the first mobile network mode or the second mobile network mode.

10. The method of claim 9, further comprising: setting the multi-network communications circuitry of the field device to match a mobile network mode other than the previous mobile network mode; establishing communications on the mobile network mode using the multi-network communications circuitry; and measuring a signal quality of the mobile network mode.

11. The method of claim 3, further comprising:
if the previous mobile network mode is the first mobile network mode, attempting to establish a data transfer connection with the server computing device on the first mobile network mode; and
if the attempt fails to establish a data transfer connection on the first mobile network mode, attempting to establish a data transfer connection with the server computing device on the second mobile network mode.

12. The method of claim 11, further comprising:
if the attempt fails to establish a data transfer connection on the second mobile network mode, switching off the multi-network communications circuitry of the field device.

13. The method of claim 11, further comprising:
if the attempt fails to establish a data transfer connection on the second mobile network mode, stopping the attempt to create an operable data transfer channel between the field device and the server computing device.

14. A field device for automatically selecting one of a plurality of mobile network modes, the system comprising: a functional circuit configured to perform a predetermined function of the field device; at least one processing subcircuit configured to control operation of the field device; and a set of one or more storage subcircuits storing processor instructions that, when executed by the at least one processing subcircuit, cause the field device to: store information about a previous mobile network mode, the previous mobile network mode being one of the plurality of mobile network modes through which an operable data transfer connection has previously been established between the field device and a server computing device; attempt to establish an operable data transfer connection between the field device and the server computing device on the previous mobile network mode using the information about the previous mobile network; monitor whether the data transfer connection is established with the server computing device on the previous mobile network mode; when the data transfer connection is not established, attempt to establish a data transfer connection with the server computing device on another of the plurality of mobile network modes; and when the data transfer connection is established with the server computing device on any one of the plurality of mobile network modes, stop the attempt to establish a data transfer connection with the server computing device on others of the plurality of mobile network modes.

15. The field device of claim 14, wherein the processor instructions further cause the processing subcircuit of the field device to: store information about the previous mobile network mode if the attempt fails to establish a data transfer connection with the server computing device on one of the other mobile network modes.

16. The field device of claim 14, wherein the plurality of mobile network modes includes a first mobile network mode and a second mobile network mode, the first mobile network mode using a Global System for Mobile Communications (GSM) technology, and the second mobile network mode using a Code Division Multiple Access (CDMA) technology.

17. The field device of claim 16, wherein the processor instructions further cause the field device to:
    establish communications on the first and second mobile network modes;
    measure signal qualities of the first and second mobile network modes; and
    if the data transfer connection is established with the server computing device on any of the mobile network modes, transferring data of the signal qualities of the first and second mobile network modes to the server computing device.

18. A non-transitory storage medium comprising processor instructions that, when executed, cause a field device to: store information about a previous mobile network mode among a plurality of mobile network modes, the plurality of mobile network modes including a first mobile network mode and a second mobile network mode, the previous mobile network mode being a mobile network mode through which an operable data transfer connection has previously been established between the field device and a server computing device; attempt to establish a data transfer connection with the server computing device on the previous mobile network mode using the information about the previous mobile network; monitor that the data transfer connection is established between the field device and the server computing device on the previous mobile network mode; if the data transfer connection is not established, attempt to establish a data transfer connection with the server computing device on one of the other mobile network modes; if the data transfer connection is established with the server computing device on any one of the plurality of mobile network modes, stop the attempt to establish a data transfer connection with the server computing device on the rest of the mobile network modes; store information about the previous mobile network mode if the attempt fails to establish a data transfer connection with the server computing device on one of the other mobile network modes; if the data transfer connection is established with the server computing device on any of the mobile network modes, transferring data of signal qualities of all of the mobile network modes to the server computing device; if the previous mobile network mode is the first mobile network mode, attempt to establish a data transfer connection with the server computing device on the first mobile network mode; if the attempt fails to establish a data transfer connection on the first mobile network mode, attempt to establish a data transfer connection with the server computing device on the second mobile network mode; and if the attempt fails to establish a data transfer connection on the second mobile network mode, switching the field device into an inactive operation.

* * * * *